(12) United States Patent
Kitazato et al.

(10) Patent No.: US 10,567,098 B2
(45) Date of Patent: Feb. 18, 2020

(54) RECEPTION APPARATUS, TRANSMISSION APPARATUS, AND DATA PROCESSING METHOD

(71) Applicant: SONY CORPORATION, Tokyo (JP)

(72) Inventors: Naohisa Kitazato, Tokyo (JP); Tatsuya Igarashi, Tokyo (JP); Yasuaki Yamagishi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 36 days.

(21) Appl. No.: 15/520,161

(22) PCT Filed: Oct. 21, 2015

(86) PCT No.: PCT/JP2015/079646
§ 371 (c)(1),
(2) Date: Apr. 19, 2017

(87) PCT Pub. No.: WO2016/067989
PCT Pub. Date: May 6, 2016

(65) Prior Publication Data
US 2017/0331572 A1 Nov. 16, 2017

(30) Foreign Application Priority Data
Oct. 28, 2014 (JP) ................................ 2014-219660

(51) Int. Cl.
*H04H 60/25* (2008.01)
*H04N 21/458* (2011.01)
*H04H 60/27* (2008.01)

(52) U.S. Cl.
CPC ............ *H04H 60/25* (2013.01); *H04H 60/27* (2013.01); *H04N 21/4586* (2013.01)

(58) Field of Classification Search
CPC ...... H04N 21/43; H04N 21/435; H04N 21/23; H04N 21/235; H04H 60/25
See application file for complete search history.

(56) References Cited

U.S. PATENT DOCUMENTS 9,712,864 B2 * 7/2017 Lee ................... H04N 21/2187
2009/0268806 A1 * 10/2009 Kim ............... H04N 21/234327
375/240.01

(Continued)

FOREIGN PATENT DOCUMENTS

| JP | 2004-194245 A | 7/2004 |
| JP | 2014-057227 A | 3/2014 |
| WO | 2008/032371 A1 | 3/2008 |

OTHER PUBLICATIONS

ATSC Standard: Non-Real-Time Content Delivery, ATSC A/103:2014, Jul. 25, 2014 (Year: 2014).*

(Continued)

*Primary Examiner* — Robert J Hance
(74) *Attorney, Agent, or Firm* — Oblon, McClelland, Maier & Neustadt, L.L.P.

(57) ABSTRACT

There is provided an apparatus and a method for efficiently reliably executing a service worker (SW) which is a data management program in a reception apparatus and update processing of its management resource. A service worker information table (SWIT) which is a table storing information on a service worker (SW), which is a data management program for stored data of a reception apparatus, and contains update processing information in an individual SW unit is received, and data management processing using the received SWIT is executed. The SWIT is a table recording an SW identifier and update information on the SW and a management resource specified by the SW identifier, and the reception apparatus performs update processing of the SW and the management resource by referring to the SWIT.

17 Claims, 13 Drawing Sheets

(56) References Cited

U.S. PATENT DOCUMENTS

| | | | | |
|---|---|---|---|---|
| 2010/0162339 A1* | 6/2010 | Suh | .................... | H04N 21/4345 725/118 |
| 2010/0180007 A1* | 7/2010 | Suh | ..................... | H04N 21/235 709/217 |
| 2010/0186058 A1* | 7/2010 | Suh | ..................... | H04N 21/235 725/110 |
| 2010/0186059 A1* | 7/2010 | Suh | .................... | H04N 7/173 725/110 |
| 2010/0309387 A1* | 12/2010 | Eyer | .................... | H04N 21/235 348/731 |
| 2011/0289542 A1* | 11/2011 | Kitazato | ............ | H04N 21/2625 725/115 |
| 2013/0024894 A1* | 1/2013 | Eyer | .................... | H04N 21/433 725/40 |
| 2013/0201399 A1* | 8/2013 | Kitazato | .................. | H04N 5/44 348/553 |
| 2013/0247119 A1 | 9/2013 | Suh et al. | | |
| 2017/0251277 A1 | 8/2017 | Suh et al. | | |

OTHER PUBLICATIONS

Extended European Search Report dated May 2, 2018 in Patent Application No. 15854031.0, 8 pages.
ARIB STD-B60, Chapter 10 the transport of application, pp. 122-144.
ARIB STD-B24, vol. 4, Chapter 4 Application Control, Chapter 5 application information table in section format, pp. 82-98.
"Data Coding and Transmission Specification for Digital Broadcasting", Arib Standard Arib STD-B24, vol. 4, 2013, pp. 82-98.
"MMT-Based Media Transport Scheme in Digital Broadcasting Systems", Arib Standard Arib STD-B60, 2014, pp. 122-144.
Japanese Office Action dated May 14, 2019 in Japanese Patent Application No. 2016-556517, 4 pages.

* cited by examiner

FIG. 9

SWIT (Service Worker Information Table)

| | ELEMENT/ATTRIBUTE | | | | | | CARDINALITY | FORMAT | DESCRIPTION |
|---|---|---|---|---|---|---|---|---|---|
| | SWIT | | | | | | | | |
| 1 | @url | | | | | | 0..1 | anyURI | URL FOR RE-ACQUIRING SWIT |
| 2 | app | | | | | | 1..n1 | | APPLICATION (ASSOCIATED WITH SW) |
| 3 | | @applicationId | | | | | 1 | integer | application_id OF AIT |
| 4 | | sw | | | | | 1..n2 | | SERVICE WORKER |
| 5 | | | @swName | | | | 1 | string | SERVICE WORKER NAME |
| 6 | | | @version | | | | 1 | string | VERSION |
| 7 | | | @url | | | | 0..1 | anyURI | ACQUISITION SOURCE WHEN SW ITSELF IS UPDATED |
| 8 | | | @gpid | | | | 0..1 | integer | UPDATED GROUP ID WHEN SW ITSELF IS UPDATED |
| 9 | | | resourceList | | | | 1 | | CACHE TARGET RESOURCE LIST |
| 10 | | | | resource | | | 1..n3 | | CACHE TARGET RESOURCE |
| 11 | | | | | @gpid | | 0..1 | integer | UPDATED GROUP ID/NO-UPDATE IS INDICATED WHEN NOTHING IS DESIGNATED. |
| 12 | | | | | @url | | 1 | string | RESOURCE ACQUISITION SOURCE URL |
| 13 | | | | | @version | | 1 | string | VERSION |
| 14 | | | updateSchedule | | | | 0..1 | | UPDATE SCHEDULE INFORMATION |
| 15 | | | | updateGp | | | 1..n4 | | UPDATED GROUP |
| 16 | | | | | @gpid | | 1 | integer | UPDATED GROUP ID |
| 17 | | | | | schedule | | 1 | | UPDATE SCHEDULE INFORMATION, ONE OF FOLLOWING INFORMATION SHOULD BE DESCRIBED |
| 18 | | | | | | @nextUpdate | 0..1 | dateTime | NEXT UPDATE DATA/TIME |
| 19 | | | | | | @updateDuration | 0..1 | integer | UPDATE FREQUENCY INFORMATION 1: 10 MINUTES, 2: 1 HOUR, 3: 3 HOURS, 4: 6 HOURS, 5: 12 HOURS, 6: 1 DAY, 7: 1 WEEK, 8: 1 MONTH |

FIG. 11

RECEPTION APPARATUS, TRANSMISSION APPARATUS, AND DATA PROCESSING METHOD

CROSS REFERENCE TO RELATED APPLICATIONS

This application is a U.S. National Phase of International Patent Application No. PCT/JP2015/079646 filed on Oct. 21, 2015, which claims priority benefit of Japanese Patent Application No. JP 2014-219660 filed in the Japan Patent Office on Oct. 28, 2014. Each of the above-referenced applications is hereby incorporated herein by reference in its entirety.

TECHNICAL FIELD

The present disclosure relates to a reception apparatus, a transmission apparatus, and a data processing method. The present disclosure more specifically relates to, for example, a data processing method for a reception apparatus and a transmission apparatus which perform transmission or reception of data via a broadcast wave or a network, and communication data.

BACKGROUND ART

Recently, development and standardization of a system which transmits/receives content, such as a broadcast program, by unidirectional communication, such as a broadcast wave, from a transmission apparatus which provides content, such as a broadcast station or a content server, to a reception apparatus, such as a television, a PC, or a mobile terminal, or by bidirectional or a unidirectional communication via a network, such as the internet, has been actively proceeding.

Note that, as a conventional technology disclosing a technology for achieving data delivery via a broadcast wave and a network, there is, for example, Patent Document 1 (Japanese Patent Application Laid-Open No. 2014-057227).

As a standard regarding a data delivery system via a broadcast wave and a network, the standardization of the Advanced Television System Committee (ATSC) 3.0 has been proceeding.

In the ATSC 3.0, a packaging system for download-type application delivery management and an offline-application registration/update management system are under consideration.

On the other hand, the World Wide Web Consortium (W3C) which is the international standardization body of the World Wide Web (WWW) using technology is developing the specification of a service worker (SW) constituted by a control program and the like used to achieve the use of an application convenient for a client.

In order to achieve the effective use of the framework of the service worker (SW) in a client which is a reception apparatus for broadcast content, delivery management of application parts to be broadcast-delivered or the service worker (SW) itself should be effectively performed.

CITATION LIST

Patent Document

Patent Document 1: Japanese Patent Application Laid-Open No. 2014-057227

SUMMARY OF THE INVENTION

Problems to be Solved by the Invention

The present disclosure is to provide a reception apparatus, a transmission apparatus, and a data processing method which efficiently use the framework of the above service worker (SW) in a client which is a reception apparatus for broadcast content.

The service worker (SW) performs management of a resource (various data files such as an application, a moving image, a still image, and audio) used in the reception apparatus, specifically, acquisition of a resource, update, deletion processing, or the like.

However, specific specifications have not been defined when update processing is performed to their management target resource or the service worker (SW) itself.

The present disclosure has been made in view of this problem, and is to provide a reception apparatus, a transmission apparatus, and a data processing method which can reliably update the service worker (SW) or the management resource.

Solutions to Problems

A first aspect of the present disclosure is a reception apparatus including a data processing unit which receives a service worker information table (SWIT) which is a table storing information on a service worker (SW), which is a data management program for stored data of the reception apparatus, and contains update processing information in an individual service worker (SW) unit, and performs data management processing using the received SWIT.

Furthermore, a second aspect of the present disclosure is a transmission apparatus which transmits a service worker information table (SWIT) which is a table storing information on a service worker (SW), which is a data management program for stored data of a reception apparatus, and contains update processing information in an individual service worker (SW) unit.

Furthermore, a third aspect of the present disclosure is a data processing method performed in a reception apparatus including receiving, by a data processing unit of the reception apparatus, a service worker information table (SWIT) which is a table storing information on a service worker (SW), which is a data management program for stored data, and contains update processing information in an individual service worker (SW) unit, and performing, by the data processing unit, data management processing using the received SWIT.

Furthermore, a fourth aspect of the present disclosure is a data processing method performed in a transmission apparatus including transmitting a service worker information table (SWIT) which is a table storing information on a service worker (SW), which is a data management program for stored data of a reception apparatus, and contains update processing information in an individual service worker (SW) unit.

Other purposes, characteristics, and advantages of the present disclosure will be apparent from more detailed description based on the embodiment of the present disclosure to be described later and the attached drawings. Note that, a system in the present specification is a logical assembled configuration of a plurality of apparatuses, and is not limited to the one in which the apparatuses are in the same housing.

Effects of the Invention

According to one embodiment of the present disclosure, it is possible to achieve an apparatus and a method for efficiently reliably performing update processing of a service worker (SW) which is a data management program in a reception apparatus and its management resource.

Specifically, for example, a service worker information table (SWIT) which is a table storing information on the service worker (SW), which is a data management program for stored data of the reception apparatus, and contains update processing information in an individual SW unit is received, and data management processing using the received SWIT is executed. The SWIT is a table recording an SW identifier and update information on the SW and a management resource specified by the SW identifier, and the reception apparatus performs update processing of the SW and the management resource by referring to the SWIT.

With the present configuration, it is possible to achieve an apparatus and a method for efficiently reliably executing a service worker (SW) which is a data management program in a reception apparatus and update processing of its management resource.

Note that, the effects described in the present specification are merely exemplified and not limited, and there may be additional effects.

BRIEF DESCRIPTION OF DRAWINGS

FIG. 9 is a diagram explaining a configuration example of data in a service worker information table (SWIT).

FIG. 11 is a diagram explaining a processing sequence of processing performed in the reception apparatus.

MODE FOR CARRYING OUT THE INVENTION

Figure 1:
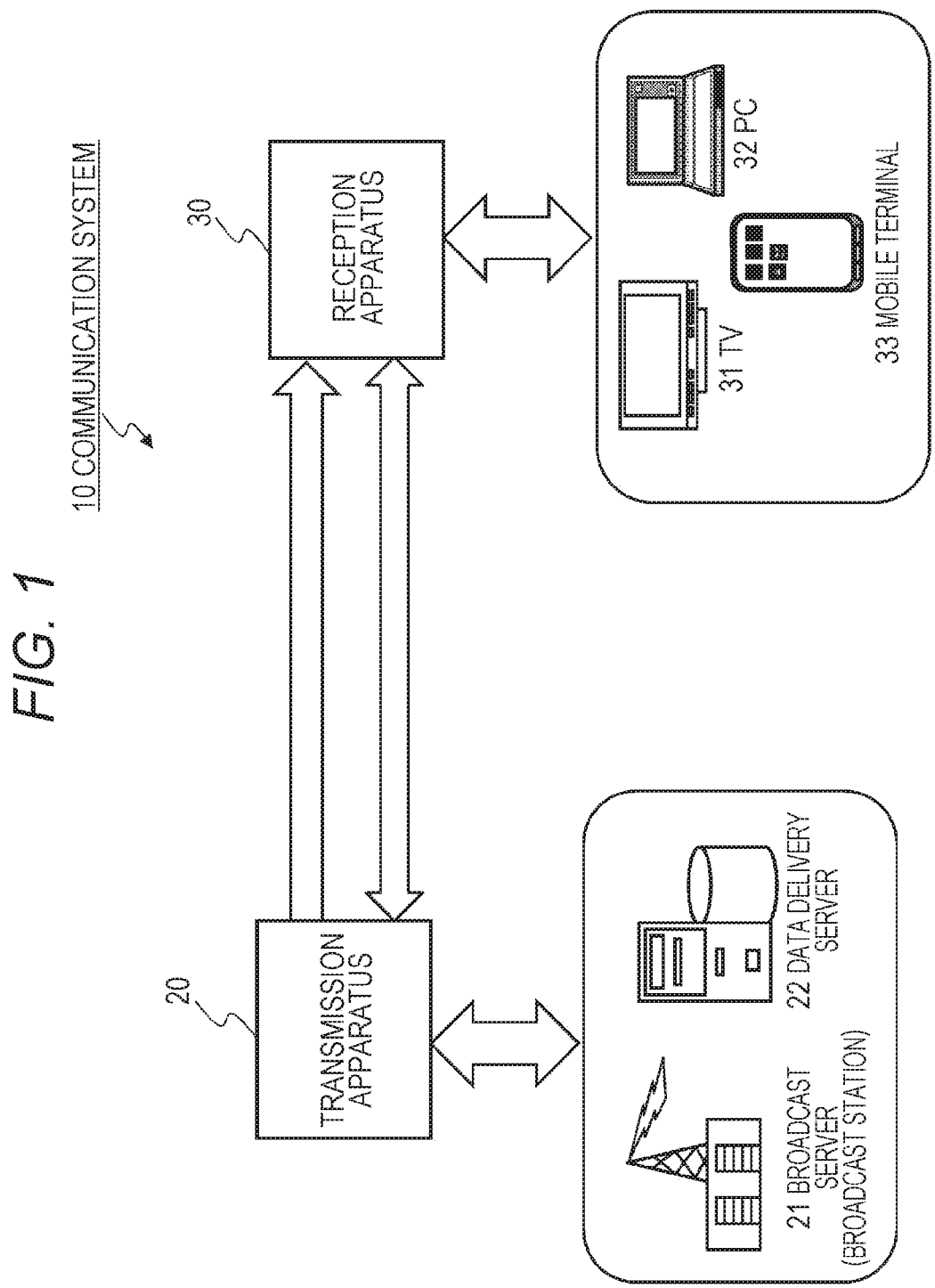
FIG. 1 is a diagram explaining a configuration example of a communication system which performs processing of the present disclosure.

Hereinafter, a reception apparatus, a transmission apparatus, and a data processing method of the present disclosure are detailedly described with reference to the drawings. Note that, the description is made according to the following items:

1. Configuration example of communication system
2. Data communication protocols FLUTE and ROUTE
3. Communication processing examples performed by transmission apparatus and reception apparatus
4. Details of signaling data
5. Service worker (SW)
6. Configuration example and processing of reception apparatus
7. Configuration example of service worker information table (SWIT)
8. Use processing sequence of service worker (SW) and application
  8-1. Processing sequence in processing phase 1
  8-2. Processing sequence in processing phase 2
  8-3. Processing sequence in processing phase 3
9. Configuration examples of transmission apparatus and reception apparatus
10. Summary of configurations in the present disclosure

[1. Configuration Example of Communication System]

First, a configuration example of a communication system which performs processing of the present disclosure is described with reference to FIG. 1.

As illustrated in FIG. 1, a communication system 10 includes a transmission apparatus 20 which is a communication apparatus for transmitting content such as video data or audio data, and a reception apparatus 30 which is a communication apparatus for receiving the content transmitted by the transmission apparatus 20.

The transmission apparatus 20 is, specifically, an apparatus which provides content, such as a broadcast station 21 or a content server 22.

On the other hand, the reception apparatus 30 is a general user's client apparatus, and includes, for example, a television 31, a PC 32, a mobile terminal 33, or the like specifically.

The data communication between the transmission apparatus 20 and the reception apparatus 30 is performed as a communication using at least either or both of a bidirectional or a unidirectional communication via a network such as the internet or/and a unidirectional communication by a broadcast wave or the like.

The content transmission from the transmission apparatus 20 to the reception apparatus 30 is performed in accordance with, for example, the MPEG-DASH standard which is an adaptive streaming technology standard.

The MPEG-DASH standard includes the following two standards:

(a) A standard on a manifest file (a media presentation description: MPD) for describing metadata which is information for managing a moving image and an audio file, and (b) A standard on a file format (segment format) for transmitting moving image content.

The content delivery from the transmission apparatus 20 to the reception apparatus 30 is performed in accordance with the above MPEG-DASH standard.

The transmission apparatus 20 encodes content data and generates a data file containing encoded data and metadata of the encoded data. The encoding processing is performed in accordance with, for example, the MP4 file format defined in the MPEG. Note that, when the transmission apparatus 20 generates an MP4 format data file, a file of encoded data is referred to as "mdat", and metadata is referred to as "moov", "moof", or the like.

The content provided from the transmission apparatus 20 to the reception apparatus 30 is various types of data of, for example, video data such as music data, a movie, a television program, video, a picture, a document, a painting, or a chart, a game, software, or the like.

The transmission data from the transmission apparatus 20 is described with reference to FIG. 2.

Figure 2:
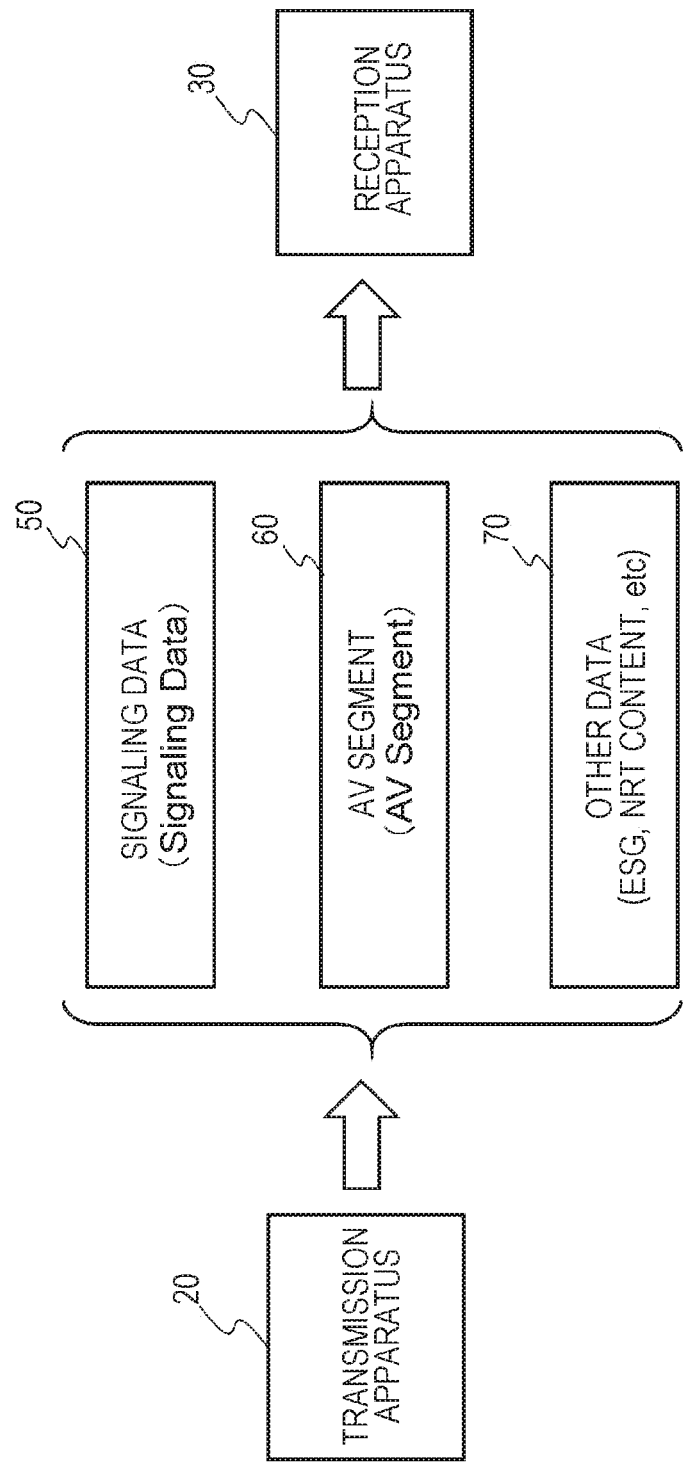
FIG. 2 is a diagram explaining transmission data from a transmission apparatus.

The transmission apparatus 20 which transmits data in accordance with the MPEG-DASH standard transmits the data roughly divided into the following types as illustrated in FIG. 2:

(a) Signaling data 50
(b) AV segment 60
(c) Other data (ESG, NRT content, and the like) 70

The AV segment 60 is constituted by video or audio data to be reproduced in the reception apparatus, that is, program content or the like provided by a broadcast station, for example. The AV segment 60 is constituted by, for example, the above MP4 encoded data (mdat) and metadata (moov or moof).

On the other hand, the signaling data 50 is constituted by program schedule information such as a program table, address information necessary for acquiring a program (a uniform resource locator (URL) or the like), information necessary for content reproduction processing such as guide information constituted by codec information (encoding system or the like), and control information.

The reception apparatus 30 needs to receive the signaling data 50 preceding the AV segment 60 storing program content to be reproduced.

The signaling data 50 is transmitted to the reception apparatus (client) which is a user terminal such as a smartphone or a television as, for example, extensible markup language (XML) format data.

As described above, the signaling data is repeatedly transmitted as needed. For example, the signaling data is frequently repeatedly transmitted every 100 msec or the like.

This enables the reception apparatus (client) to immediately acquire the signaling data at any time.

It is possible for the client (reception apparatus) to perform, as needed, the processing necessary for the reception and reproduction of program content, such as the acquisition of an address for accessing necessary program content or codec setting processing, on the basis of receivable signaling data without delay.

The other data 70 contains, for example, an electronic service guide (ESG), NRT content, and the like.

The ESG is an electronic service guide and is, for example, guide information on a program table or the like.

The NRT content is non-real time content.

The NRT content contains, for example, a data file such as various application files, moving images, still images, and the like which are to be executed in the browser of the reception apparatus 30 which is the client.

The NRT content also contains a service worker used as a control program for an application to be described later, or the like.

The following data illustrated in FIG. 2, that is, (a) the signaling data 50 (b) the AV segment 60, and (c) the other data (ESG, NRT content, and the like) 70 are transmitted in accordance with, for example, a data communication protocol: File Delivery over Uni-directional Transport (FLUTE).

[2. Data Communication Protocols FLUTE and ROUTE]

The data communication protocol: File Delivery over Uni-directional Transport (FLUTE) is a protocol for session management of content to be transmitted by multicast.

For example, a file, which is identified by a URL and a version, generated at a side of the server which is the transmission apparatus is transmitted to the client which is the reception apparatus in accordance with the FLUTE protocol.

The reception apparatus (client) 30 associates the URL and version of the received file with the file and stores in, for example, a storage unit (client cache) of the reception apparatus (client) 30.

A file having the same URL but a different version is assumed to be a file the contents of which are updated. The FLUTE protocol only performs unidirectional file transfer control, and does not have a selective filtering function of a file in a client. However, the selective filtering is achieved by selecting a file to be transfer-controlled by the FLUTE using metadata linked with the file at the client side, and it is possible to manage the configuration and update of the local cache reflecting user's preferences.

Note that, the metadata may be extended and incorporated in the FLUTE protocol, or may be separately described by a protocol such as the electronic service guide (ESG).

Note that, the FLUTE has been specified as a file transfer protocol in multicast initially. The FLUTE is constituted by a multicast protocol of a scalable file object called an FDT or an ALC, specifically, by a combination of an LCT and an FEC component which are the building blocks.

The conventional FLUTE is developed to be used mainly for asynchronous file transfer, but has been extended to be applied to broadcast live streaming by the Advanced Television System Committee (ATSC) which is the standardization body regarding a data delivery system via a broadcast wave and a network recently. The extended specification of the FLUTE is called Real-Time Object Delivery over Uni-directional Transport (ROUTE).

As a standard the standardization of which has been proceeding recently as a standard regarding a data delivery system via a broadcast wave and a network, there is the Advanced Television System Committee (ATSC) 3.0. The ATSC 3.0 defines a stack configuration used for transmission of signaling data, an ESG, an asynchronous file, a synchronous stream, or the like by replacing the ROUTE with the conventional FLUTE protocol.

[3. Communication Processing Examples Performed by Transmission Apparatus and Reception Apparatus]

Next, a communication processing example performed by the transmission apparatus and the reception apparatus is described.

Figure 3:
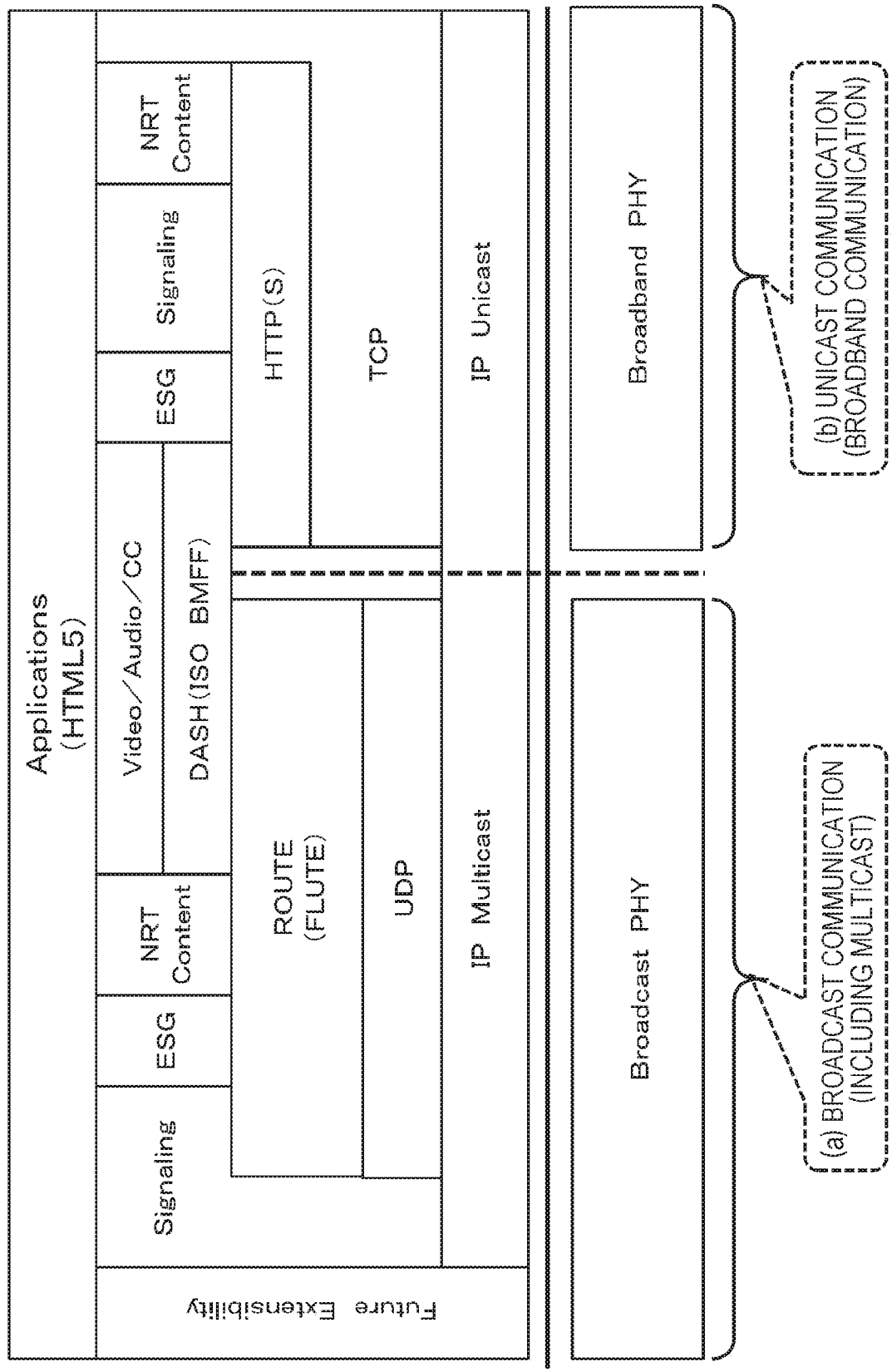
FIG. 3 is a diagram illustrating an example of a protocol stack of a transmission apparatus and a reception apparatus.

FIG. 3 is a diagram illustrating an example of a protocol stack of the transmission apparatus and the reception apparatus.

The example illustrated in FIG. 3 includes two protocol stacks for performing the following two types of communication data processing:

(a) Broadcast (including multicast) communication (for example, broadcast-type data delivery), and
(b) Unicast (broadband) communication (for example, HTTP-type P2P communication)

The left side of FIG. 3 is the protocol stack corresponding to (a) broadcast communication (for example, broadcast-type data delivery).

The right side of FIG. 3 is the protocol stack corresponding to (b) unicast (broadband) communication (for example, HTTP-type P2P communication).

The protocol stack illustrated at the left side of FIG. 3 and corresponding to (a) broadcast communication (for example, broadcast-type data delivery) has the following layers in the order from the lower layer:

(1) Broadcast physical layer (Broadcast PHY)
(2) IP multicast layer (IP Multicast)

(3) UDP layer (4) ROUTE (=extended FLUTE) layer (5) ESG, NRTcontent, DASH (ISO BMFF) and Video/Audio/CC (6) Application layer (Applications (HTML5))

Note that, a signaling layer is set as an upper layer of (2) IP multicast layer (IP Multicast).

The signaling layer is a layer used to transmit and receive the signaling data 50 previously described with reference to FIG. 2. The signaling data contains program schedule information such as a program table, address information (URL or the like) necessary for acquiring a program, information necessary for content reproduction processing such as guide information constituted by codec information (encoding system or the like), and control information.

Note that, as an upper layer of (1) broadcast physical layer (Broadcast PHY), a use acceptable layer (Future Extensibility) of a new protocol for future is set.

(1) The broadcast physical layer (Broadcast PHY) is a physical layer constituted by a communication control unit which controls, for example, a broadcast-system communication unit for performing broadcast communication.

(2) The IPmulticast layer (IPMulticast) is a layer for performing data transmission/reception processing in accordance with the IP multicast.

(3) The UDP layer is a processing layer for generating and analyzing a UDP packet.

(4) The ROUTE layer is a layer for storing or extracting transfer data in accordance with a ROUTE protocol which is the extended FLUTE protocol.

The ROUTE is, similarly to the FLUTE, constituted by a multicast protocol of a scalable file object called an FDT or an ALC, specifically, by a combination of an LCT and an FEC component which are the building blocks.

(5) The ESG, NRTcontent, DASH (ISO BMFF) and Video/Audio/CC are data to be transferred in accordance with the ROUTE protocol.

A broadcast-type delivery service in accordance with the DASH standard is referred to as a multimedia broadcast multicast service (MBMS). As a system for efficiently achieving the MBMS with the LTE, there is an evolved Multimedia Broadcast Multicast Service (eMBMS).

The MBMS or the eMBMS is a broadcast-type delivery service, and is a service for simultaneously delivering the same data, such as movie content, to a plurality of user terminals (UE) which are the reception apparatuses positioned within a specific area by a common bearer. By the broadcast delivery in accordance with the MBMS or the eMBMS, it is possible to simultaneously delivery the same content to a large number of reception apparatuses, such as smartphones, PCs or televisions positioned in a delivery service providing area.

The MBMS and the eMBMS define the processing for downloading a file based on the 3GPP file format (an ISO-BMFF file or a MP4 file) in accordance with the transfer protocol ROUTE or FLUTE.

The most of the following data previously described with reference to FIG. 2, that is, (a) the signaling data 50, (b) the AV segment 60, and (c) the other data (ESG, NRT content, and the like) 70 is transmitted in accordance with the ROUTE protocol or the FLUTE protocol.

(5) The ESG, NRTcontent, DASH (ISO BMFF) and Video/Audio/CC are data to be transferred in accordance with the ROUTE protocol.

The ESG is an electronic service guide and is, for example, guide information on a program table or the like.

The NRTcontent is non-real time content

As described above, the NRT content contains, for example, a data file such as various application files, moving images, still images, and the like which are to be executed in the browser of the reception apparatus which is the client. Furthermore, The NRT content also contains a service worker (SW) used as a control program for an application to be described later, or the like.

The Video/Audio/CC is actual data to be reproduced such as video and audio delivered in accordance with the DASH standard.

(6) The application layer (Applications (HTML5)) is an application layer for generating or analyzing data to be transferred in accordance with the ROUTE protocol and for further performing output control of various types of data, and performs generation, analysis, and output processing of, for example, data using the HTML5.

On the other hand, the protocol stack illustrated at the right side of FIG. 3 and corresponding to (b) unicast (broadband) communication (for example, HTTP-type P2P communication) has the following layers in the order from the lower layer:

(1) Broadband physical layer (Broaband PHY)

(2) IP unicast layer (IP Unicast)

(3) TCP layer (4) HTTP layer (5) ESG, Signaling, NRTcontent, DASH (ISO BMFF) and Video/Audio/CC (6) Application layer (Applications (HTML5))

(1) The broadband physical layer (Broaband PHY) is a physical layer constituted by a communication control unit such as a device driver which controls a communication unit such as a network card which performs broadband communication.

(2) The IP unicast layer (IP Unicast) is a layer for performing IP unicast transmission/reception processing.

(3) The HTTP layer is a processing layer for generating and analyzing an HTTP packet.

The upper layer is similar to the stack configuration of (a) broadcast communication (for example, broadcast-type data delivery) at the left side of FIG. 3.

Note that, the transmission apparatus (server) 20 and the reception apparatus (client) 30 perform processing in accordance with at least any one of the two processing systems of FIG. 3, that is, the two communication protocol stacks of (a) broadcast communication (for example, broadcast-type data delivery) and (b) unicast (broadband) communication (for example, HTTP-type P2P communication).

In the protocol stack illustrated in FIG. 3, an attribute (including a URL which is an identifier of a file) of a file group to be multicast-transferred in accordance with the ROUTE (FLUTE) can described in a control file of the ROUTE (FLUTE) or in the signaling data describing a file transfer session. Furthermore, a more detailed attribute of the file transfer session can be described by the ESG (which can be used for a proposal usage to an end user).

[4. Details of Signaling Data]

The signaling data is data containing access information of an AV segment to be received and reproduced by the reception apparatus (client), guide information necessary for processing after reception such as decoding processing, and control information, and is data to be repeatedly transmitted from the transmission apparatus as needed.

The detailed configuration of service channel signaling (SCS) contained in the signaling data is described with reference to FIG. 4.

The SCS is service channel signaling and contains guide information corresponding to the content to be provided to a user and control information.

Note that, the SCS contains a plurality types of signaling data in various information units.

Specifically, the SCS contains a user service description (USD) which is signaling data in a service unit.

Furthermore, the USD contains the following three types of signaling data storing information on a delivery method:
Session description (SDP)
File delivery description (FDD)
Repair flow description (RFD)

Furthermore, the USD contains a media presentation description (MPD) as various types of guide information corresponding to content (AV segment) and signaling data having a manifest file storing control information.

These types of signaling data is data necessary for each reception apparatus (client) to receive and reproduce the AV segment transmitted from the transmission apparatus, is basically set as an individual file (metafile) by category, and transmitted from the transmission apparatus.

Figure 4:
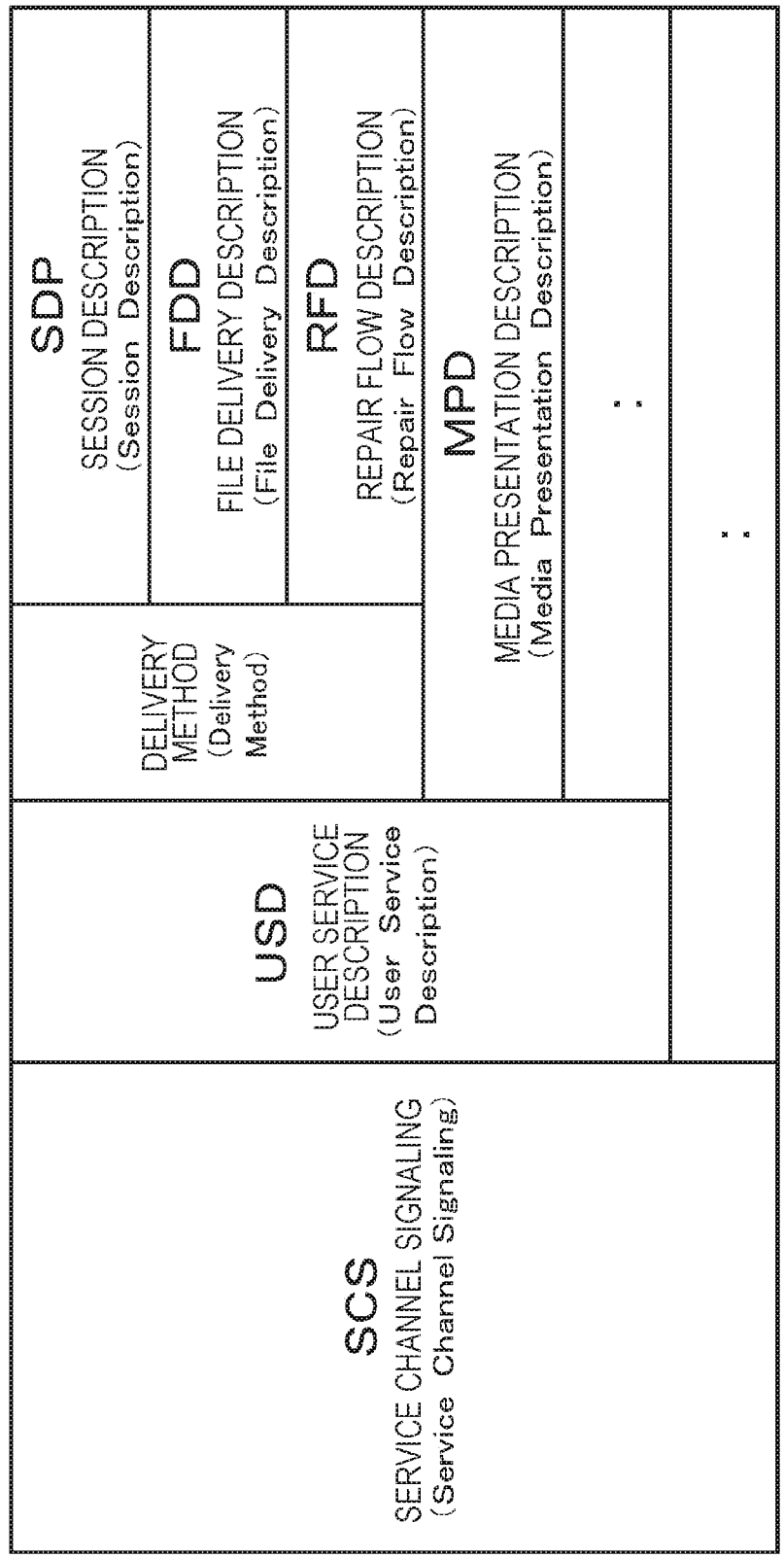
FIG. 4 is a diagram explaining a configuration example of signaling data.

Note that, the signaling data illustrated in FIG. 4 is an example, and there can be other signaling data.

[5. Service Worker (SW)]

Next, a service worker (SW) provided by the transmission apparatus (server) 20 and mainly used in the reception apparatus (client) 30 is described.

The service worker (SW) is provided from the transmission apparatus 20, such as a broadcast server 21 or a data delivery server 22, to the reception apparatus.

The service worker (SW) is a program which executes an application (=application program) to be executed in the reception apparatus (client) 30, processing for acquiring a data file or the like used when the application is executed, storing processing to a storage unit (cache), update processing, deletion processing, or the like. Specifically, the service worker (SW) is constituted by, for example, JavaScript (registered trademark).

The service worker (SW) is set corresponding to, for example, a broadcast program (broadcast content) provided by the transmission apparatus 20 such as the broadcast server 21 or the data delivery server 22, and is provided to the reception apparatus 30 as a program for controlling and managing the application provided from the transmission apparatus 20 to the reception apparatus 30.

The service worker (SW), the application, and the data file used when the application is executed are provided from the transmission apparatus 20 to the reception apparatus 30 as, for example, the non-real time content (NRT content) previously described with reference to FIGS. 2 and 3.

Alternatively, a data providing server different from the server which delivers the broadcast program may provide the service worker (SW), the application, and the data file when the application is executed to the reception apparatus 30.

The service worker (SW) performs management (acquisition, hold, update, deletion, or the like) processing of, for example, the application or the like which performs information display using a browser which is a program used to perform processing for browsing a web page in the reception apparatus 30.

A specific example (use case) of processing using the service worker (SW) is described with reference to FIGS. 5 and 6.

Figure 5:
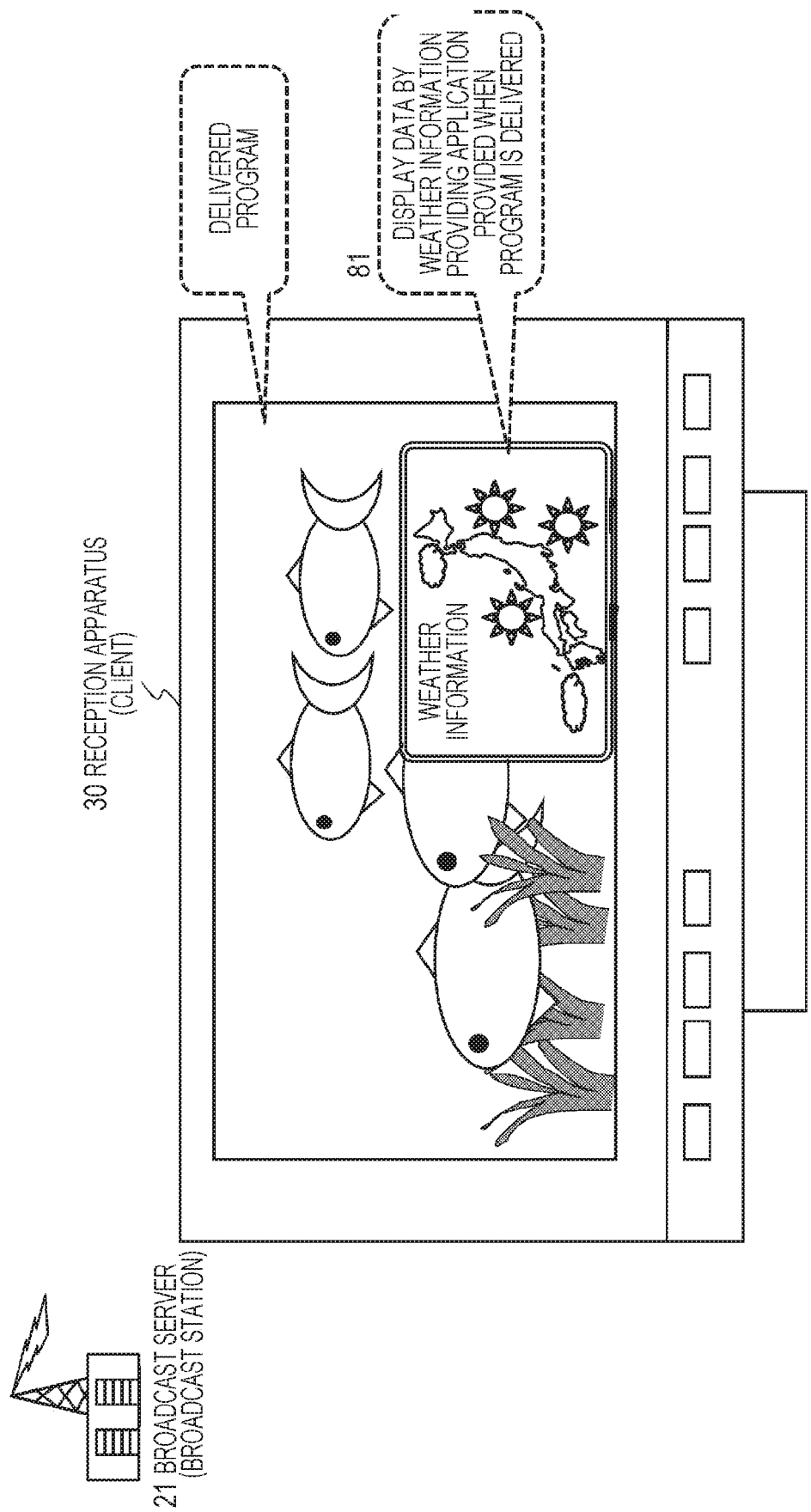
FIG. 5 is a diagram explaining a specific example (use case) of processing using a service worker (SW).

FIG. 5 illustrates that the reception apparatus 30 is receiving certain program content from the transmission apparatus 20 such as the broadcast server 21, and displaying the content on a display unit of the reception apparatus 30.

The transmission apparatus 20 such as the broadcast server 21 provides, according to a program delivery, an application for displaying weather information and various data files used by the weather information display application, for example, data files containing various types of data such as a moving image, a still image, audio, and the like to the reception apparatus 30 as the non-real time content (NRT content).

Hereinafter, the application and the data file are referred to as a "resource".

The broadcast server 21 provides the service worker (SW) as a resource management program for managing the "resource" to the reception apparatus 30 as the non-real time content (NRT content).

The reception apparatus 30 can display the weather information according to the program display as illustrated in FIG. 5 using the "resource" received from the transmission apparatus 20, that is, the application and the data file.

With a conventional data delivery configuration, such data display using an application cannot be performed after the end of a program in which the application is provided.

This is because that the resource such as the weather information display application is set to a state in which the resource is usable in the reception apparatus 30 during the reception of the program, for example, a state in which the resource is stored in a temporary storage cache and usable, but is set to a state in which the cache data is deleted or inaccessible after the program ends or when the user changes the channel.

The service worker (SW) functions as the resource management program to use such the application or data corresponding to a program after the program ends or the channel is changed, or even in an offline state, such as a broadcast non-reception state or a network non-connection state.

Figure 6:
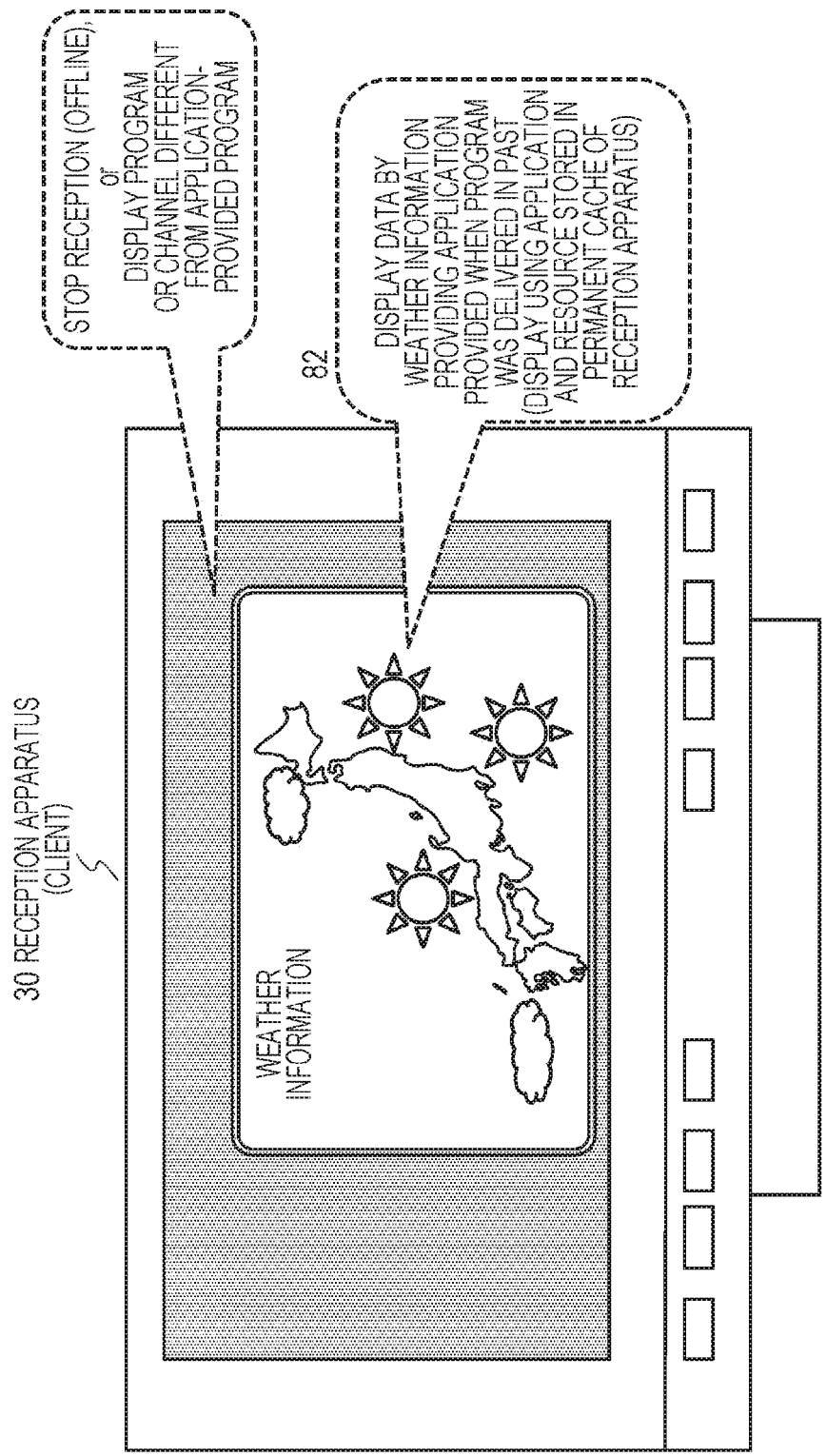
FIG. 6 is a diagram explaining a specific example (use case) of the processing using the service worker (SW).

As illustrated in FIG. 6, it is possible to use the weather information display application after the program providing the application ends or the channel is changed to another channel, or even in an offline state in which data is not being received. In other words, it is possible to display and browse the weather information on the display unit of the reception apparatus 30.

Note that, the weather information display application is a program to be displayed on, for example, a browser.

The weather information display application is stored in the storage unit (permanent cache) of the reception apparatus 30 under the control of the service worker (SW). For example, when there is a request (event) such as a display request from a user, the weather information display application is read from the storage unit (permanent cache) and displayed on the display unit under the control of the service worker (SW).

Note that, it is preferable that the storage unit (permanent cache) storing a resource such as an application and the like is a non-volatile memory in which stored data is not deleted although the power of the reception apparatus 30 is turned off.

As described above, by using the service worker (SW), it is possible to use the application corresponding to various programs regardless of the display or the non-display of the program.

Note that, the service worker (SW) is set, for example, for a resource (application, and application associated data) unit corresponding to a program, and is provided from the transmission apparatus 20 to the reception apparatus 30 according to the resource or around the resource transmission.

The service worker (SW) can be set corresponding to each program, or the service worker (SW) commonly used by a resource corresponding to a specific channel including a plurality of programs can be set.

The service worker (SW) and the resource (application and application associated data) managed by the service worker (SW) are stored in the storage unit (permanent cache) of the reception apparatus 30.

Figure 7:
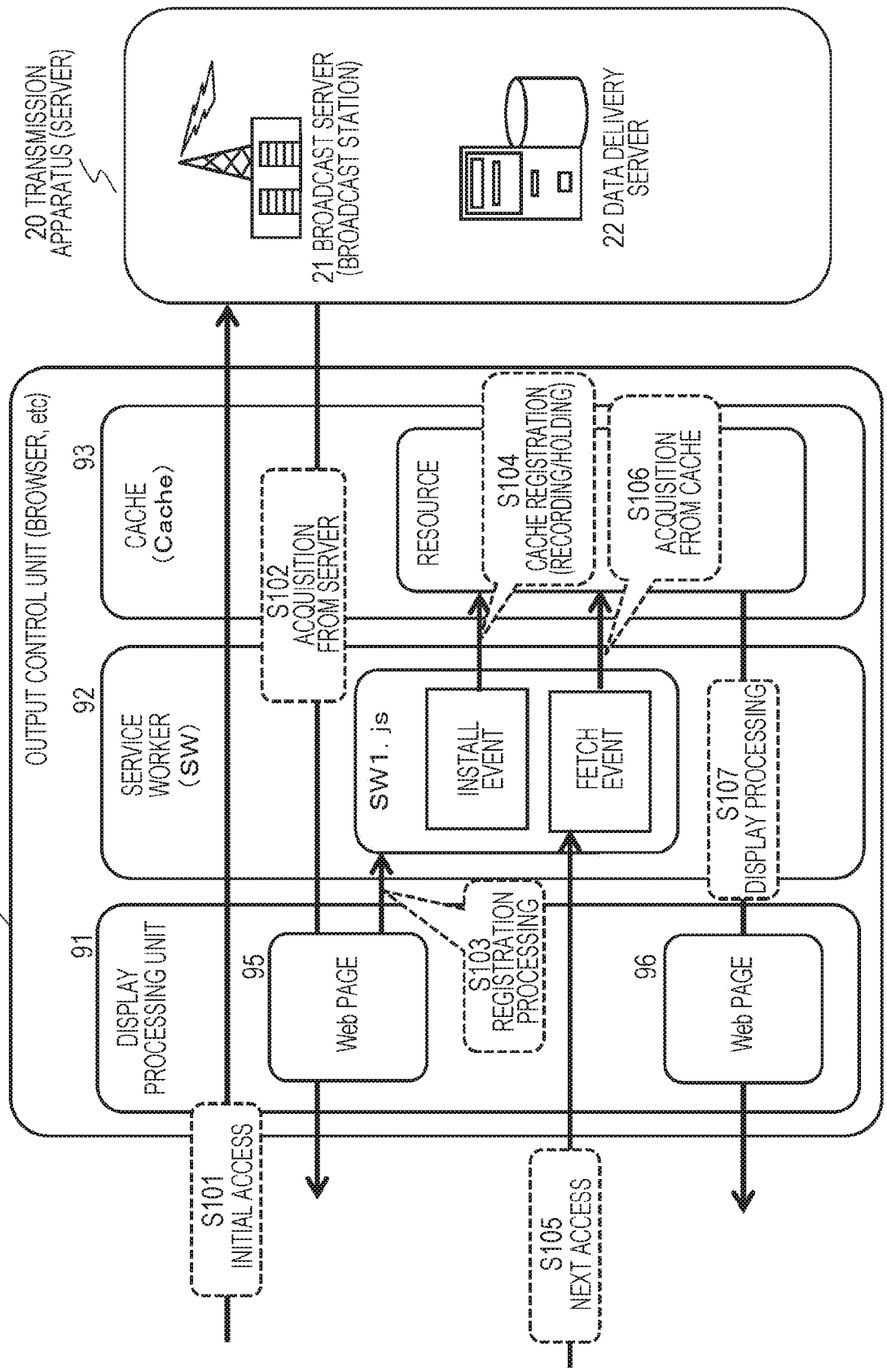
FIG. 7 is a diagram explaining an example of the processing using the service worker (SW).

FIG. 7 is a diagram explaining an example of processing using the service worker (SW).

FIG. 7 illustrates an example of a sequence in which the reception apparatus 30 acquires a web page (for example, a weather information display page illustrated in FIGS. 5 and 6) as a resource from the transmission apparatus 20, stores it in the storage unit (permanent cache) of the reception apparatus 30, and uses it.

Note that, the web page is displayed using a predetermined web page display application and a resource constituted by data for display.

FIG. 7 illustrates a display processing unit 91, a service worker (SW) 92, and a cache (storage unit) 93 as constituent elements of an output control unit 90 in the reception apparatus.

Steps S101 to S102 are resource (web page) acquisition processing in first access processing from the reception apparatus 30 to the transmission apparatus 20.

This is acquired from, for example, the NRT content transmitted by a broadcast server or the like.

After the acquisition processing, the display processing unit 91 displays a web page 95 on the display unit of the reception apparatus 30. This display is being displayed according to the program providing the web page, and is equivalent to the display state previously described with reference to FIG. 3.

During the display period, when a registration (install) request of the resource (web page) is made as, for example, a user's instruction, the service worker (SW) 92 starts registration (install) processing of the resource (web page) in step S103.

Specifically, the processing for passing the resource to the cache 93 and storing it in the storage unit (permanent cache) is performed as shown by step S104.

Thereafter, after the program ends or the channel is changed, or in the offline setting state, the user makes a browsing request of a web page in step S105.

The service worker (SW) 92 detects the input of the browsing request as a fetch event, and acquires the resource (web page) from the storage unit (permanent cache) according to the fetch event detection in step S106.

The display processing unit 91 displays a web page 96 in step S107.

The web page display processing is display processing after the program ends or the channel is changed, or in the offline setting state, and is equivalent to the display state previously described with reference to FIG. 6.

As described above, by using the service worker (SW), it is possible to use an application corresponding to various programs regardless of the display or the non-display of the program, and it is possible, for example, to perform processing for displaying, at arbitrary timing, a web page set as display information attached to the program regardless of the program.

As described above, the service worker (SW) performs the resource management, such as acquisition, storage, update, or deletion, of, for example, an application constituted by a web page, an HTML page, the JavaScript (registered trademark), and the like, and a resource constituted by data and the like used by the application.

The storage unit (cache) in which the resource is stored is a storage unit (cache) which permanently stores stored data, and stores data although the application does not operate unlike a general local/temporary cache.

This is an image in which a kind of proxy server is mounted to the browser which is a web page display program and a web page can be acquired and displayed by accessing the proxy server at any time.

Note that, the service worker (SW) itself is stored (installed) in the permanent cache. When the service worker (SW) is installed in the reception apparatus, it is possible to variously control a resource to be managed by the service worker (SW).

For example, in response to the access request to the resource (the fetch request to the resource), the processing of the service worker (SW) is started, and the permanent cache provides the resource before the processing at the browser side (acquisition of the resource from the local cache or the network) is started.

Furthermore, since the service worker (SW) is provided by the JavaScirpt (registered trademark), various procedures can be incorporated, and the processing about cache control, such as partial update of the resource in the permanent cache, can be flexibly described.

Note that, the service worker (SW) itself can be updated. Although the service worker (SW) is provided from the transmission apparatus 20, various types of information necessary for the update processing, such as update date/time information and access information of the update data is recorded in header information (HTTP Cache-Control) of the service worker (SW), and the update processing is performed on the basis of the header information.

For example, on the basis of the expiration date or the like set in the header, the reception apparatus 30 performs acquisition processing of a new version service worker (SW) and update processing for replacing the previous version SW stored in the cache on the expiration date.

[6. Configuration Example and Processing of Reception Apparatus]

As described above, the reception apparatus 30 can perform, for example, an application, such as the weather information display application described with reference to FIGS. 5 and 6, that is, an application to be managed by the service worker (SW) using the service worker (SW) at arbitrary timing.

The user at the reception apparatus 30 side can browse a weather information display page or various web pages at any time by executing the application at arbitrary timing.

A configuration example of the reception apparatus 30 which receives and uses the service worker (SW) is described with reference to FIG. 8.

Figure 8:
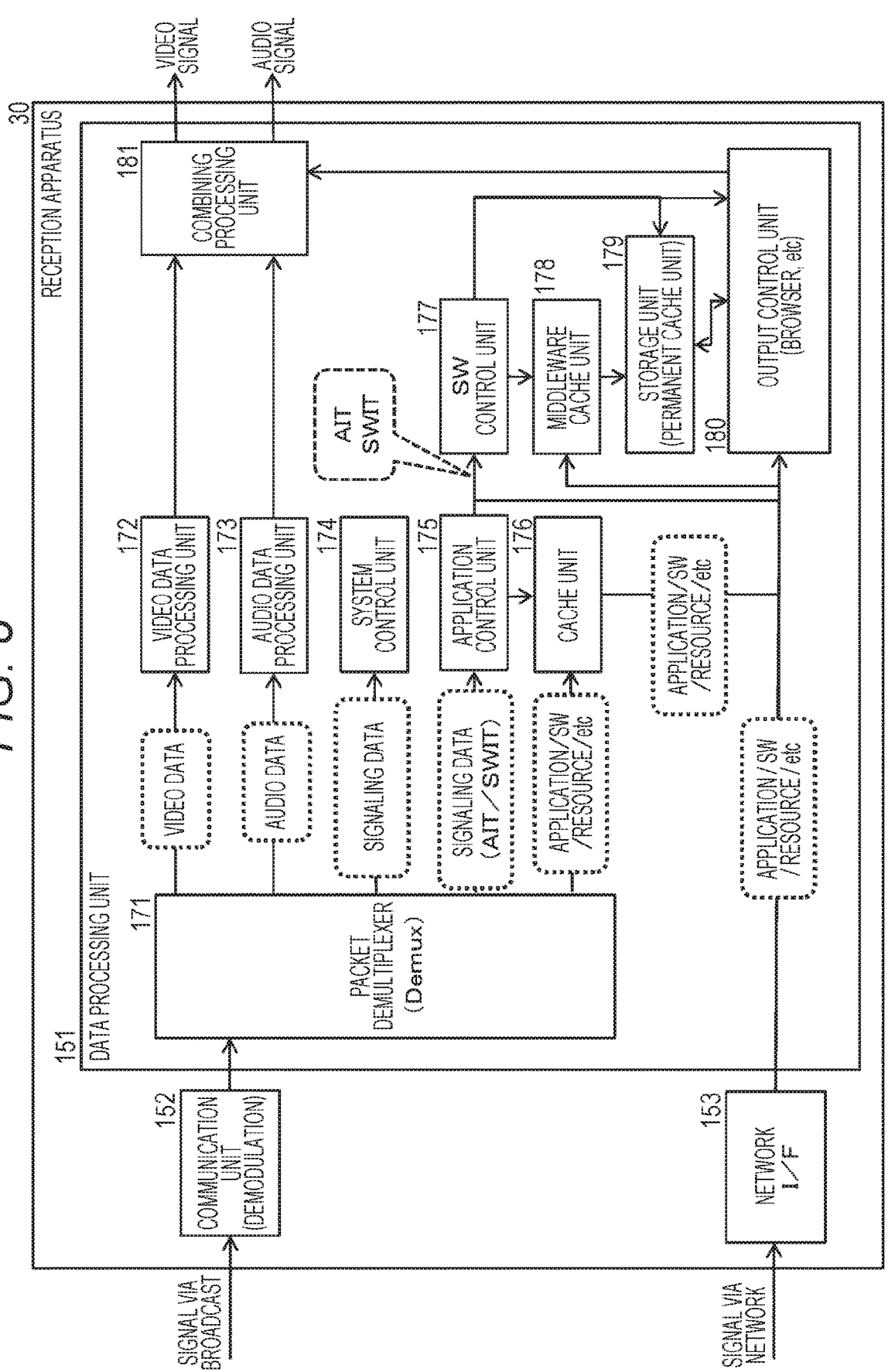
FIG. 8 is a diagram explaining a configuration example of a reception apparatus.

The reception apparatus 30 includes, as illustrated in FIG. 8, a data processing unit 151 which performs various types of data processing, a communication unit 152 which receives a broadcast wave and performs demodulation processing, and a network I/F 153 as a communication unit which performs communication processing via a network.

The data processing unit 151 of the reception apparatus 30 includes a packet demultiplexer 171, a video data processing unit 172, an audio data processing unit 173, a system control unit 174, an application control unit 175, a cache unit 176, a service worker (SW) control unit 177, a middleware (MW)

cache unit 178, a storage unit (permanent cache unit) 179, an output control unit 180, and a combining processing unit 181.

The broadcast signal transmitted from the broadcast server 21 is received and demodulated by the communication unit 152, and input to the packet demultiplexer 171.

The packet demultiplexer 171 demultiplexes, on the basis of a packet identifier (PID) of the packet received via the communication unit 152, the received packet by each data type (video, audio, control signal, or the like), and supplies each demultiplexed packet to each data processing unit.

The video data processing unit 172 acquires video data from the packet storing the video data, and performs processing necessary for video reproduction processing such as decoding processing.

The audio data processing unit 173 acquires audio data from the packet storing the audio data, and performs processing necessary for audio reproduction processing such as decoding processing.

The system control unit 174 receives various control signals, that is, the packet containing signaling data, acquires the signaling data from the packet, outputs a control signal to the constituents in the data processing unit 151, and performs control of the overall data processing.

The application control unit 175 receives partial data of the signaling data, specifically, an application information table (AIT) storing control data to the application, a service worker information table (SWIT) storing control data to the service worker (SW), or the like, and controls the application and the service worker (SW) to be executed by the reception apparatus 30.

The application control unit 175 performs execution control of the application and the service worker (SW) to be executed by the output control unit 180 using the application information table (AIT) or the service worker information table (SWIT).

Furthermore, the service worker information table (SWIT) storing the control data to the service worker (SW) is input to the service worker (SW) control unit 177.

The service worker (SW) control unit 177 performs control, such as update control, of the service worker (SW) using the service worker information table (SWIT).

The service worker (SW) control unit 177 accesses a middleware (MW) cache 178 which temporarily stores the application, the service worker (SW), the resource, or the like input via the network, or a storage unit (permanent cache) 178 which permanently stores the application, the service worker (SW), the resource which is the data to be managed by the service worker (SW), or the like, and performs update processing of the data storing in the caches.

The cache unit 176 receives the application and the service worker (SW) transmitted from the broadcast server 21, and various types of resource data to be managed by the service worker (SW).

The data is input via the cache unit 176 to the output control unit 180 which performs a browser or the like, and is used. In other words, the processing for executing the application and using the service worker (SW) is performed.

Note that, the output control unit 180 stores the application, the service worker (SW), and the resource in the storage unit (permanent cache) 179, and can use them at any time.

The network interface 153 performs the communication with the data delivery server 22, receives the application, the service worker (SW), and the resource provided by the data delivery server 22, and outputs them to the output control unit 180 or stores them in the middleware cache unit 178.

The output control unit 180 performs the processing using the application, the service worker (SW), and the resource input from the broadcast server 21 via the broadcast or input from the data delivery server 22 via the network, specifically, application execution processing or the like.

The output data generated by the output control unit 180 is combined with, for example, a broadcast program or the like by the combining processing unit 181, and is output.

[7. Configuration Example of Service Worker Information Table (SWIT)]

Next, a configuration example of a service worker information table (SWIT) recording control information on the service worker (SW) provided from the transmission apparatus 20 to the reception apparatus 30 is described with reference to FIG. 9.

The service worker information table (SWIT) is a table in which, for example, the information shown in FIG. 9 is registered.

Hereinafter, the table record information is successively described.

(1) @url: access information (URL) for re-acquiring the SWIT.

(2) app: application (=application as a service worker (SW) management resource) associated with the service worker (SW) corresponding to the SWIT.

If there is a plurality of items, the items after (2) app are set.

(3) @applicationid: an identifier (application ID) of an application recorded in an application information table (AIT) associated with the SWIT.

(4) sw: a service worker (SW) to be managed by the SWIT.

If there is a plurality of items, the items after (4) sw are set.

(5) @swName: a service worker name of the service worker (SW) defined in (4).

(6) @version: a version of the service worker (SW) defined in (4) (the version is changed when updated).

(7) @url: access information (URL) when an updated service worker (SW) of the service worker (SW) defined in (4) is acquired.

(8) @gpid: an identifier of an update group (update group ID) to which the updated service worker (SW) of the service worker (SW) defined in (4) belongs.

(9) resouceList: a list of a resource (cache target resource) to be managed by the service worker (SW) associated with the SWIT.

(10) resource: a resource to be managed by the service worker (SW) associated with the SWIT.

If there is a plurality of items, the items after (10) resource are set.

(11) @gpid: an identifier of the update group (update group ID) to which the resource defined in (10) belongs. (When nothing is designated, no-update is indicated)

(12) url: access information (URL) when the resource (update resource) defined in (10) is acquired.

(13) version: a version of the resource defined in (10).

(14) updateSchedule: update schedule information of the service worker (SW) defined in (4).

(15) updateGp: a group (update group) of the service worker (SW) and the resource having the same update schedule.

If there is a plurality of items, the items after (15) updateGp are set.

(16) @gpid: an identifier of the update group defined in (15) (update group ID).

(17) scedule: update schedule information of the update group defined in (15) (detailed information is recorded in (18) or (19)).

(18) @nextUpdate: next update date/time as the update schedule information of the update group defined in (15).

(19) @updateDuration: update frequency information as the update schedule information of the update group defined in (15) (for example, 1: 10 minutes, 2: 1 hour, 3: 3 hours, 4: 6 hours, 5: 12 hours, 6: 1 day, 7: 1 week, and 8: 1 month).

For example, the information illustrated in FIG. 9 is recorded in the service worker information table (SWIT).

[8. Use Processing Sequence of Service Worker (SW) and Application]

Next, use processing sequence of the service worker (SW) and the application in the reception apparatus 30 is described with reference to FIGS. 10 and 11.

Figure 10:
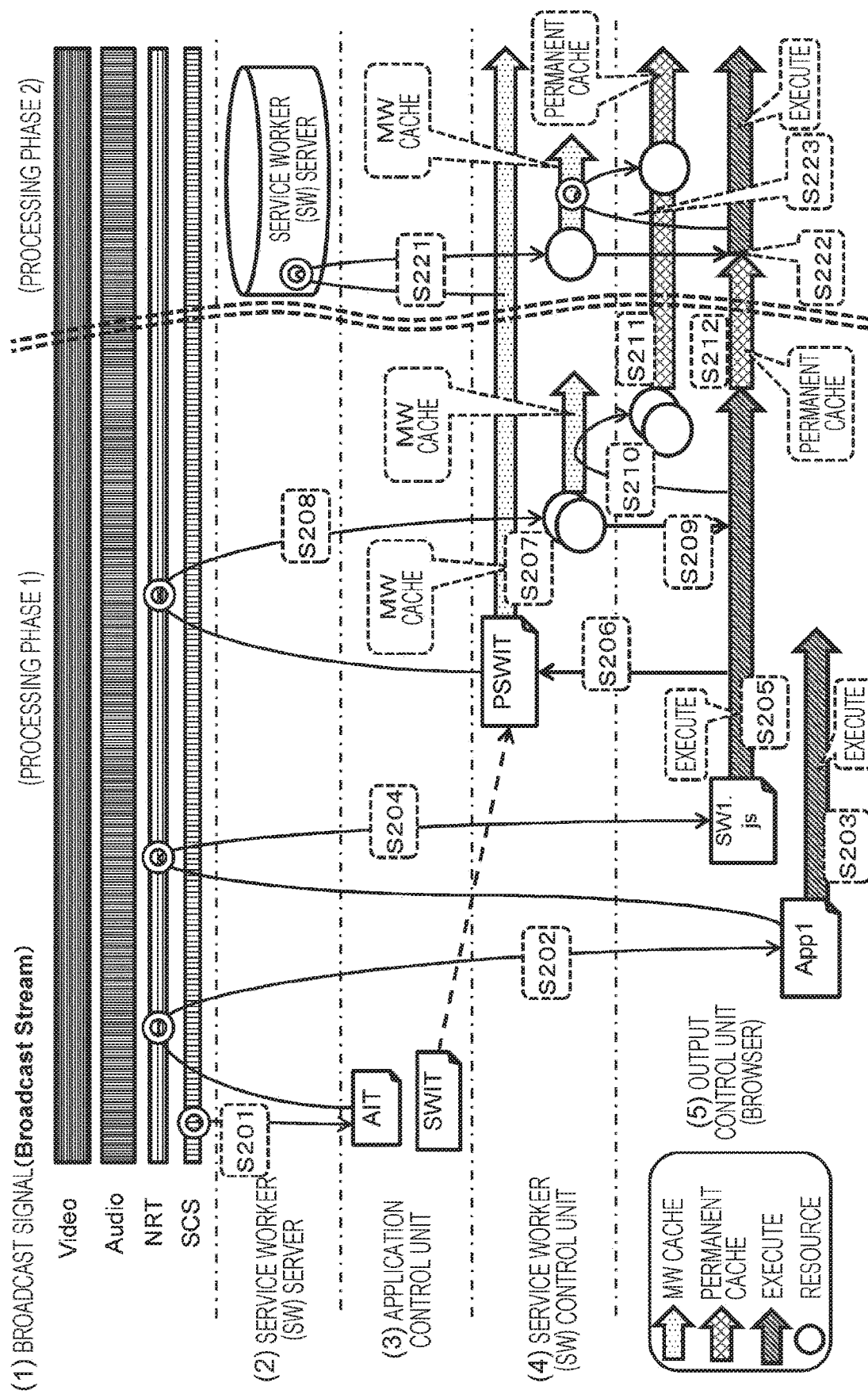
FIG. 10 is a diagram explaining a processing sequence of processing performed in the reception apparatus.
Figure 11:
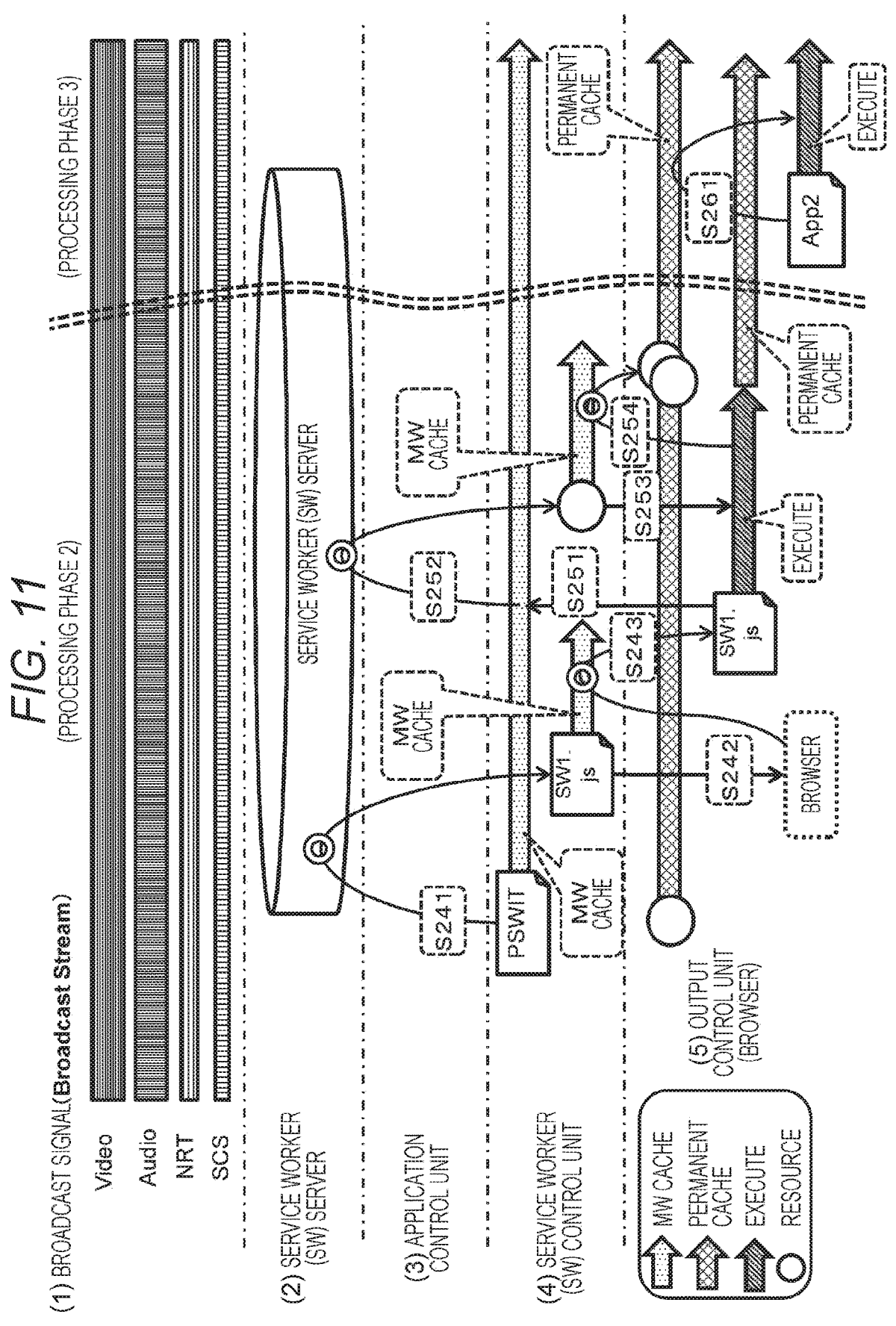

FIGS. 10 and 11 are drawings explaining the processing according to the time axis flowing from left to right, and illustrate processing of each following element and data flow between the elements.

(1) Broadcast signal (Video, Audio, NRT, SCS)
(2) Service worker (SW) server
(3) Application control unit
(4) Service worker (SW) control unit
(5) Output control unit (browser)

(1) The broadcast signal is a signal output by the broadcast server 21 via a broadcast wave. For example, a video and audio signals constituting the program content, the non-real time content (NRT) equivalent to a file, such as an application or a service worker (SW), and the SCS as the signaling data are continuously transmitted via a broadcast wave.

The SCS is, as previously described with reference to FIG. 4, service channel signaling and contains guide information corresponding to the content to be provided to a user and control information.

(2) The service worker (SW) server is equivalent to, for example, the data delivery server 22 illustrated in FIG. 1. The transmission processing of the service worker (SW) is performed.

Note that, the service worker (SW) server is described as a server which transmits the service worker (SW) in the example described below, but may additionally provide a resource as an application or management data of the service worker.

(3) application control unit, (4) service worker (SW) update control unit, and (5) output control unit (browser) are the constituents in the data processing unit 151 of the reception apparatus 30 described with reference to FIG. 4.

(3) The application control unit is equivalent to the application control unit 175 illustrated in FIG. 4.

(4) The service worker (SW) control unit is equivalent to the service worker (SW) control unit 177 illustrated in FIG. 4.

(5) The output control unit (browser) is equivalent to the output control unit (browser) 180 illustrated in FIG. 4.

In FIGS. 10 to 11, the time elapses from the left to the right.

As processing according to the lapse of time, processing in each phase of processing phases 1 to 3 is described below.

[8-1. Processing Sequence in Processing Phase 1]

A processing phase 1 is a phase in which the processing for the reception apparatus 30 to acquire the application and the service worker (SW) from the broadcast signal, to perform the processing using them, and to store the service worker (SW) and the resource in the storage unit (permanent cache) is performed.

Each processing in steps S201 to S210 performed in the processing phase 1 is successively described.

(Step S201)

The application control unit 175 of the reception apparatus 30 acquires an application information table (AIT) which is a control information storing table for the application and a service worker information table (SWIT) which is a control information storing table of the service worker (SW) from service channel signaling (SCS) which is signaling data of a broadcast signal.

The double circle on the SCS illustrated in the drawing indicates that these tables are acquired from the SCS.

The AIT defines acquisition information (URL or the like) and starting processing (autostart) information of a specific application (App1).

(Step S202)

The application control unit 175 of the reception apparatus 30 acquires the application (App1) from the NRT signal in the broadcast signal using the acquisition information (URL or the like) of the application (App1) recorded in the AIT, and outputs it to the output control unit (browser) 180.

Note that, the application control unit 175 holds the service worker information table (SWIT) which is the control information storing table of the service worker (SW) associated with the application (App1) output to the output control unit (browser) 180.

In the service worker information table (SWIT), each data described with reference to FIG. 9 is recorded. As illustrated in FIG. 9, an application ID (@applicationId) of the AIT is recorded in the SWIT, and the SWIT and the AIT are set as the associated tables.

Note that, acquisition processing of the application (App1) in step S202 is illustrated as a setting to acquire the application (App1) from the NRT in the broadcast signal in FIG. 10, but the application (Appl) may be acquired from the data delivery server 22.

(Step S203)

The output control unit (browser) of the reception apparatus 30 starts execution processing of the application (App1) acquired in step S202.

(Step S204)

In the operation of the application (app1), registration processing (install) of the service worker (SW) is performed by a user operation, the application, or trigger information or the like in the program content corresponding to the application.

Specifically, a service worker (SW1.js) is acquired from the NRT signal included in the broadcast signal on the basis of the URL designated by the application (app1).

Note that, js means a JavaScript (registered trademark) file.

(Step S205)

The service worker (SW) is started and executed as soon as acquired by the registration (install) event.

Thereafter, the following processing (steps S206 to S209) is performed. The processing (S206 to S209) is performed in accordance with the processing information described in the service worker (SW1.js).

(Step S206)

A service worker (SW) update processing starting API is performed to the service worker control unit 177 which is middleware of the reception apparatus 30 by designating a service worker file name (SW1.js) of a specific service worker (SW) to be processed, or a service worker identifier (SW_id).

The service worker control unit 177 extracts, from the SWIT, control information corresponding to a specific service worker (SW) to be updated specified by the service worker file name (SW1.js) or the service worker identifier (SW_id).

As previously described with reference to FIG. 9, the SWIT can record control information of a plurality of service workers (SW), and control information of a service worker to be processed (sw1.js) is extracted here. This is referred to as a partial SWIT (PSWIT: partial service worker information table).

For example, as (5) @swName: the service worker name of the SWIT illustrated in FIG. 9, record entry of the service worker file name (SW1.js) is detected, and data constituted by the record regions (5) to (19) of the information on the service worker file name (SW1.js) after the entry (5) is extracted as the PSWIT.

Note that, for example, the following information is recorded in the PSWIT.

(6) @version: a version of the executing service worker (sw1.js).

(7) @url: access information (URL) when an updated service worker (SW) of the service worker (sw1.js) is acquired.

(8) @gpid: an identifier of an update group (update group ID) to which the updated service worker (SW) of the service worker (sw1.js) belongs.

Furthermore, a list of a cache target resource which is a management resource of the service worker (sw1.js), access information (URL) as information of each listed resource, an update group ID, and version information are recorded in (9) to (12).

Moreover, information on update schedule of the resource listed in the resource list is recorded in an update group unit in (13) to (19).

The service worker (SW) control unit 177 determines the cache resource to be acquired on the basis of the information recorded in the PSWIT, and acquires the cache resource in step S208 to be described below.

(Step S207)

The service worker control unit 177 stores the partial SWIT (PSWIT) in the middleware cache unit 178.

(Step S208)

The service worker control unit 177 acquires the service worker (sw1.js) cache target resource described in the partial SWIT (PSWIT) from the NRT signal, and stores it in the middleware cache unit 178 together with the version information.

Note that, resource access information is information constituted by apart of the service worker information table (SWIT), and acquired from the partial SWIT (PSWIT) constituted only by the information on the service worker (sw1.js) to be processed.

The circle at the destination of the arrow of step S208 in the drawing denotes the resource. The two circles illustrated as examples indicate that the acquisition resource is constituted by a plurality of, for example, an application and a moving image file, or the like.

(Step S209)

When completing the acquisition of the resource to be managed by the service worker (sw1.js) to be processed and the storing processing to the middleware cache unit 178, the service worker control unit 177 notifies the output control unit 180 of the processing completion. In other words, the service worker control unit 177 issues a resource cache completion event to the service worker (sw1.js) being executed in the output control unit 180.

(Steps S210 to S211)

In response to the above resource cache completion event, the service worker (sw1.js) being executed in the output control unit 180 executes the partial SWIT (PSWIT) reading API first, acquires the service worker (sw1.js) cache target resource list to be managed by the executing service worker (sw1.js), and starts the acquisition processing of the listed resource.

The service worker (sw1.js) cache target resource has been stored in the middleware cache unit 178 in step S208.

The output control unit 180 acquires the resource stored in the middleware cache unit 178, and stores it in the storage unit (permanent cache unit) 179.

The processing is performed in accordance with the processing information recorded in the service worker (sw1.js).

(Step S212)

When completing the processing in which the service worker (sw1.js) cache target resource is stored in the storage unit (permanent cache unit) 179, the output control unit 180 terminates the service worker (sw1.js) using processing, and stores the service worker (sw1.js) in the storage unit (permanent cache unit) 179.

The processing at this point is the processing in the processing phase 1.

The processing in the processing phase 1 is summarized as follows:

(S201) The application control unit 175 acquires the application information table (AIT) and the service worker information table (SWIT) from the SCS.

(S202 to S203) The output control unit 180 executes the application (Appl) acquired by the application control unit 175 from the NRT in accordance with the record information of the AIT.

(S204 to S205) The output control unit 180 acquires and executes the service worker (sw1.js) designated by the executing application (Appl).

(S206 to S208) The service worker control unit 177 acquires the partial SWIT (PSWIT) in which the control information corresponding to the service worker (sw1.js) being executed in the output control unit 180 is extracted from the SWIT, acquires the cache target resource recorded in the PSWIT from the NRT, and stores it in the middleware cache.

(S209 to S212) The output control unit 180 stores the resource stored in the middleware cache in the storage unit (permanent cache) 179, and further stores the service worker (sw1.js) in the storage unit (permanent cache) 179.

In the processing, the acquisition processing of the cache resource in steps S206 to S208 is performed by referring to the partial SWIT (PSWIT) constituted only by the information on the service worker (sw1.js) to be processed as described above.

[8-2. Processing Sequence in Processing Phase 2]

Next, processing in the processing phase 2 from step S221 is described.

The processing in the processing phase 2 is a phase in which the update processing of the resource and the service worker (SW) stored in a storage unit (permanent cache unit) 176 in the processing phase 1 is performed. The update processing is performed as the processing referring to the service worker information table (SWIT) previously described with reference to FIG. 9.

Here, the update processing is performed as the processing referring to the partial SWIT (PSWIT) constituted only by the information on the service worker (sw1.js) to be processed.

The update processing of the resource and the service worker (SW) is performed in accordance with the update schedule information recorded in the SWIT or the PSWIT.

Hereinafter, processing in each step is described.

(Step S221)

The service worker (SW) control unit 177 schedules the update acquisition of the service worker (SW) and the cache target resource which is the data to be managed in accordance with the update schedule information described in the PSWIT for each update group.

As the schedule designation, there are a method for designating next update date/time and a method for indicating an acquisition frequency. When the next update date/time is designated, the latest PSWIT is acquired from the re-acquisition source of the PSWIT (on the network) after the update processing is terminated, and is held (after checking the version).

In any of the above schedule designation methods, the service worker (SW) control unit 177 acquires the latest service worker (SW) or the cache target resource from the update acquisition source (on the network) at the designated or calculated update date/time, and holds it in the middleware cache unit 178 together with the version information (after checking the version).

The processing in step S221 is update resource acquisition processing in accordance with the schedule recorded in the PSWIT.

Note that, for example, the following information is recorded in the PSWIT as described above.

(6) @version: a version of the executing service worker (sw1.js).

(7) @url: access information (URL) when an updated service worker (SW) of the service worker (sw1.js) is acquired.

(8) @gpid: an identifier of an update group (update group ID) to which the updated service worker (SW) of the service worker (sw1.js) belongs.

Furthermore, a list of a cache target resource which is a management resource of the service worker (sw1.js), access information (URL) as information of each listed resource, an update group ID, and version information are recorded in (9) to (12).

Moreover, information on update schedule of the resource listed in the resource list is recorded in an update group unit in (13) to (19).

The service worker (SW) control unit 177 determines the cache resource to be acquired on the basis of the information recorded in the PSWIT, and acquires the cache resource.

For example, after checking the service worker name which is the service worker (SW) identifier, the version of the service worker (SW), the resource name, the version of the resource, and the like, data acquisition processing is performed.

Note that, when the cache resource to be acquired is an update resource, it is possible to perform the data acquisition processing in an update group unit in accordance with the update schedule information recorded in the PSWIT, and to efficiently perform the resource acquisition.

In other words, by referring to the SWIT or the PSWIT and checking the update group identifier and the update schedule information corresponding to the update group, it is possible to perform the resource update processing in a group unit.

(Step S222)

When the processing in step S221, that is, the processing for storing the update cache target resource in the middleware cache unit 178 together with the version information is completed, the service worker (SW) control unit 177 issues a resource cache event to the output control unit (browser) 180.

(Step S223)

In the output control unit (browser) 180, when receiving the above resource cache completion event, the service worker (sw1.js) starts the processing for acquiring the service worker (SW) cache target resource list by executing the PSWIT reading API, and for acquiring the listed resource.

The service worker (sw1.js) cache target resource has been stored in the middleware cache unit 178 in step S221.

The output control unit 180 acquires the resource stored in the middleware cache unit 178, and stores it in the storage unit (permanent cache unit) 179.

The processing is performed in accordance with the processing information recorded in the service worker (sw1.js).

(Step S241)

Next, the service worker (SW) control unit 177 schedules the update acquisition of the service worker (SW) in accordance with the update schedule information described in the PSWIT for each update group.

As the schedule designation, there are a method for designating next update date/time and a method for indicating an acquisition frequency. When the next update date/time is designated, the latest PSWIT is acquired from the re-acquisition source of the PSWIT (on the network) after the update processing is terminated, and is held (after checking the version).

In any of the above schedule designation methods, the service worker (SW) control unit 177 acquires the latest service worker (SW) from the update acquisition source (on the network) at the designated or calculated update date/time, and holds it in the middleware cache unit 178 together with the version information (after checking the version).

The processing in step S241 is updated service worker (SW) acquisition processing in accordance with the schedule recorded in the PSWIT.

The service worker (SW) control unit 177 determines the service worker (SW) to be acquired on the basis of the information recorded in the PSWIT, and acquires the service worker (SW). For example, when the service worker (SW) to be acquired is an updated SW, it is possible to perform data acquisition processing in an update group unit in accordance with the update schedule information recorded in the PSWIT, and to efficiently acquire the service worker (SW).

In other words, by referring to the SWIT or the PSWIT and checking the update group identifier and the update schedule information corresponding to the update group, it is possible to perform the service worker (SW) update processing in a group unit.

(Step S242)

When the processing in step S241, that is, the processing for storing the updated service worker (SW) in the middleware cache unit 178 together with the version information is completed, the service worker (SW) control unit 177 issues a service worker (SW) cache completion event to the output control unit (browser) 180.

(Step S243)

When receiving the above service worker (SW) cache completion event, the output control unit (browser) 180 performs re-registration processing (install) as the update processing of the corresponding service worker (SW). In this case, consequently, the updated service worker (SW) file held by the middleware cache unit 178 is drawn and held by the storage unit (permanent cache unit) 179 as a new service worker (SW).

Note that, thereafter, the re-acquisition processing of the management resource corresponding to the updated service worker (SW) is performed.

This is the processing in steps S251 to S254 illustrated in the drawing.

Step S251 is event issuing processing as a processing instruction to the service worker control unit 177 by the updated service worker.

The subsequent processing in steps S252 to S254 is similar processing to the processing in previously described steps S221 to S223.

Note that, the storing processing of the resource and the service worker (SW) to the storage unit (permanent cache unit) 179 can be performed by the method of the above cache completion event, or in accordance with the processing defined in the service worker (SW) by the timer processing of the service worker (SW) or invalidate (expire) designation.

The processing at this point is the processing in the processing phase 2.

The processing in the processing phase 2 is summarized as follows:

(S221) The service worker (SW) control unit 177 determines the cache resource to be acquired on the basis of the information recorded in the PSWIT, acquires the cache resource, and stores the acquired update cache target resource in the middleware cache unit 178 together with the version information.

(S222) The service worker (SW) control unit 177 issues the resource cache event to the output control unit (browser) 180.

(S223) The service worker (sw1.js) being executed in the output control unit (browser) 180 acquires the cache target resource list from the PSWIT, acquires the listed resource from the middleware cache unit 178, and stores it in the storage unit (permanent cache unit) 179.

(S241-S243)

The processing in steps S241 to S243 is the processing in which the update resource in the above processing in steps S221 to S223 is replaced with the updated service worker (SW), and the update processing in which the information of the service worker (SW) to be updated is acquired by referring to the PSWIT is performed.

(S251-S254)

The processing in steps S251 to S254 is the acquisition processing of the management resource of the service worker (SW) updated in the above processing in steps S241 to S243.

In the processing, the acquisition processing of the update cache resource in steps S221 to S223 and the acquisition processing of the updated service worker (SW) in steps S241 to S243 are performed by referring to the partial SWIT (PSWIT) constituted only by the information on the service worker (sw1.js) to be processed as described above.

For example, when the cache resource to be acquired is an update resource, it is possible to perform the data acquisition processing in an update group unit in accordance with the update schedule information recorded in the PSWIT, and to efficiently perform the resource acquisition.

[8-3. Processing Sequence in Processing Phase 3]

Next, processing in the processing phase 3 from step S261 is described.

The processing in step S261 is the use processing of the service worker (SW) by the application.

The following application operation can be performed at any timing after the previously described processing phase 1.

(Step S261)

The output control unit 180 starts the application linked with the program by a different AIT at an arbitrary date/time different from the time when the service worker (SW) is registered.

By accessing the management resource of the service worker (SW) on the basis of the started application, it is possible to read and use the latest resource stored in the storage unit (permanent cache) 179.

[9. Configuration Examples of Transmission Apparatus and Reception Apparatus]

Next, apparatus configuration examples of the transmission apparatus (server) 20 and the reception apparatus (client) 30 which are communication apparatuses are described with reference to FIGS. 12 and 13.

Figure 12:
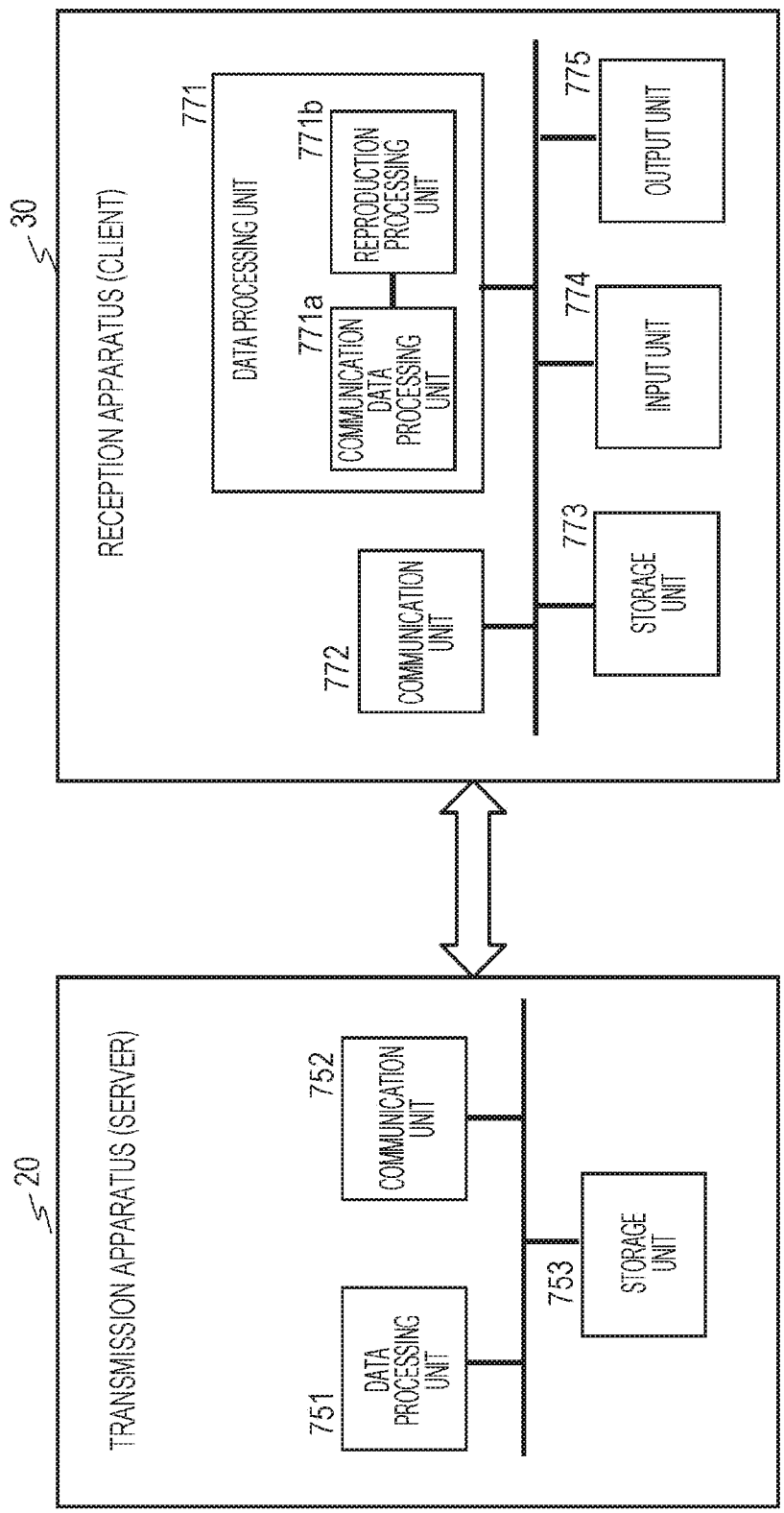
FIG. 12 is a diagram explaining configuration examples of the transmission apparatus and the reception apparatus which are communication apparatuses.

FIG. 12 illustrates the configuration examples of the transmission apparatus (server) 20 and the reception apparatus (client) 30.

The transmission apparatus (server) 20 includes a data processing unit 751, a communication unit 752, and a storage unit 753.

the reception apparatus (client) 30 includes a data processing unit 771, a communication unit 772, a storage unit 773, an input unit 774, and an output unit 775.

The data processing unit includes a communication data processing unit 771a and a reproduction processing unit 771b.

The data processing unit 751 of the transmission apparatus (server) 20 performs various types of data processing to perform data delivery service. For example, the data processing unit 751 performs configuration data generation and transmission control of the data delivery service. Furthermore, the data processing unit 751 performs generation and transmission processing of the application and the service worker (SW) to be provided to the reception apparatus (client) 30, other various types of data, and the signaling data.

The communication unit 752 performs communication processing, such as delivery of the AV segment, the application, the service worker (SW), other various types of data, the signaling data, and the like.

The storage unit 753 stores the AV segment, the application, the service worker (SW), the data used by the application, the signaling data, and the like which are to be delivered.

Furthermore, the storage unit 753 is used as a work area of data processing performed by the data processing unit 751, and is also used as a storage region of various parameters.

On the other hand, the reception apparatus (client) 30 includes the data processing unit 771, the communication unit 772, the storage unit 773, the input unit 774, and the output unit 775.

The communication unit 772 receives the data delivered from the transmission apparatus (server) 20, such as the AV segment, the application, the service worker (SW), the data used by the application, the signaling data, or the like.

The data processing unit 771 includes the communication data processing unit 771a and the reproduction processing unit 771b, and performs, for example, the processing in accordance with the previously described embodiment.

Specifically, the data processing unit 771 performs the data processing or the like using the application, the API, and the service worker (SW).

Various commands, such as user's instruction commands of, for example, channel selection, application start, install, and the like, are input via the input unit 774.

The reproduction data is output to the output unit 775 such as a display unit and a speaker.

The storage unit 773 stores the AV segment, the service worker (SW), the application, the data used by the application, and the signaling data.

Furthermore, the storage unit 773 is used as a work area of data processing performed by the data processing unit 771, and is also used as a storage region of various parameters.

Figure 13:
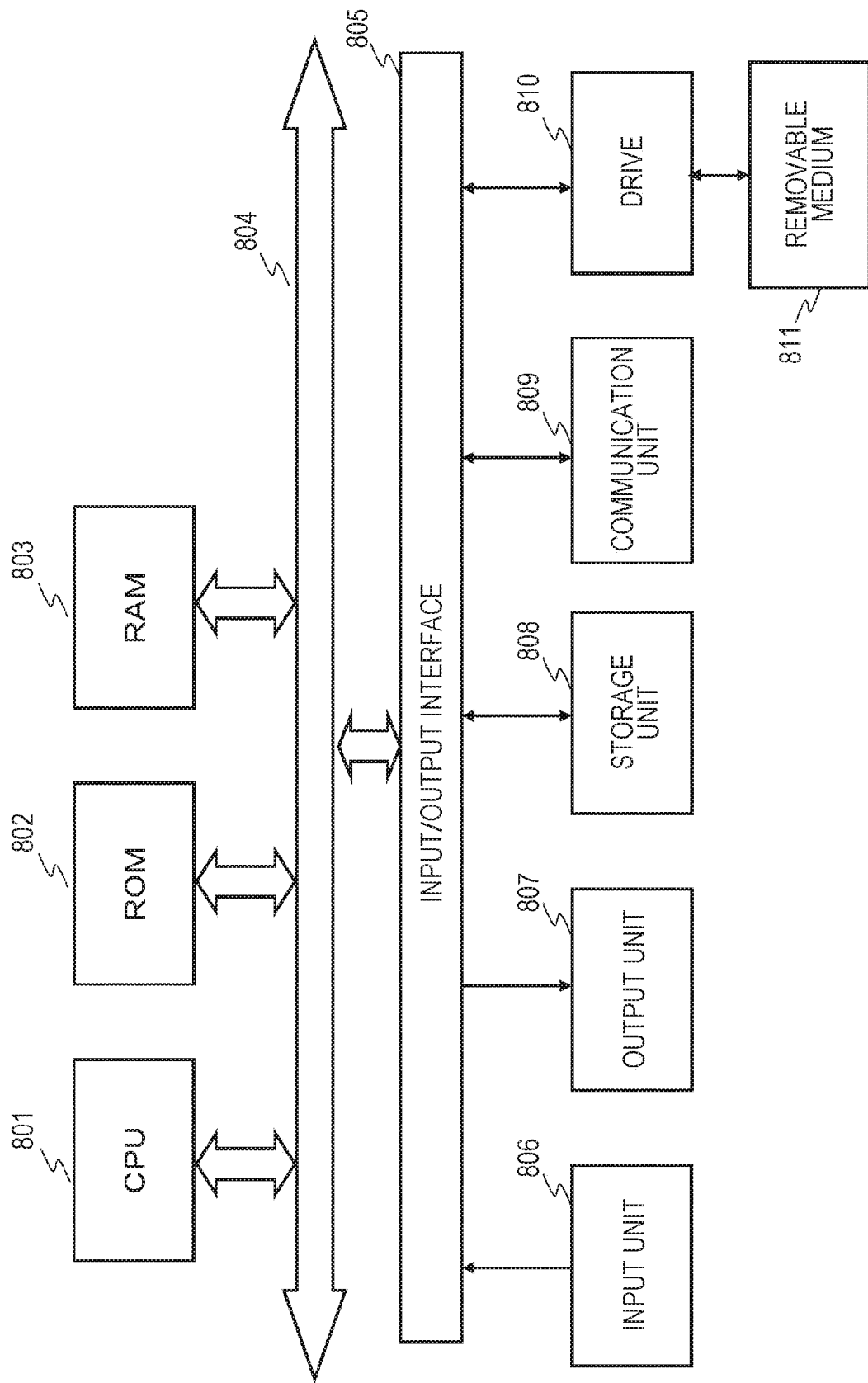
FIG. 13 is a diagram explaining a hardware configuration example of the transmission apparatus and the reception apparatus which are communication apparatuses.

FIG. 13 illustrates a hardware configuration example of a communication apparatus capable of being used as the transmission apparatus 20 or the reception apparatus 30.

A central processing unit (CPU) 801 functions as a data processing unit which performs various types of processing in accordance with a program stored in a read only memory (ROM) 802 or a storage unit 808. For example, the CPU 801 performs the processing in accordance with the sequence described in the above embodiment. A program to be executed by the CPU 801 and data is stored in a random access memory (RAM) 803. The CPU 801, the ROM 802, and the RAM 803 are connected with each other by a bus 804.

The CPU 801 is connected with an input/output interface 805 via the bus 804. The input/output interface 805 is connected with an input unit 806 including various switches, a keyboard, a mouse, a microphone, and the like, and an output unit 807 including a display, a speaker, and the like. The CPU 801 performs various types of processing in response to the command input from the input unit 806, and outputs the processing result to, for example, the output unit 807.

The storage unit 808 connected with the input/output interface 805 includes, for example, a hard disk and the like, and stores a program to be executed by the CPU 801 and various kinds of data. A communication unit 809 functions as a transmission/reception unit of data communication via a network, such as the internet or a local area network, further functions as a transmission/reception unit of a broadcast wave, and communicates with an external apparatus.

A drive 810 connected with the input/output interface 805 drives a removable medium 811 of, for example, a semiconductor memory such as a magnetic disc, an optical disc, a magneto-optical disc, or a memory card, and records or reads data.

Note that, encoding or decoding of data can be performed as processing of the CPU 801 as a data processing unit, but a codec as dedicated hardware for performing encoding processing or decoding processing may be provided.

[10. Summary of Configurations in the Present Disclosure]

With reference to a specific embodiment, the embodiment of the present disclosure has been detailedly described. However, it is obvious that a person skilled in the art can amend or replace the embodiment without departing from the scope of the present disclosure. In other words, the present invention has been disclosed as an exemplification, and should not be restrictively interpreted. In order to judge the scope of the present disclosure, claims should be considered.

Note that, the technology disclosed in the present specification can have the following configurations:

(1) A reception apparatus including a data processing unit which receives a service worker information table (SWIT) which is a table storing information on a service worker (SW), which is a data management program for stored data of the reception apparatus, and contains update processing information in an individual service worker (SW) unit, and performs data management processing using the received SWIT.

(2) The reception apparatus according to (1), in which
the SWIT is a table recording a service worker (SW) identifier and update information on a management resource of the service worker (SW) specified by the service worker (SW) identifier, and
the data processing unit performs update processing regarding the management resource of the service worker (SW) by referring to the SWIT.

(3) The reception apparatus according to (1) or (2), in which
the SWIT is a table recording a service worker (SW) identifier and update information on the service worker (SW) itself specified by the service worker (SW) identifier, and
the data processing unit performs update processing of the service worker (SW) by referring to the SWIT.

(4) The reception apparatus according to any one of (1) to (3), in which
the SWIT is a table recording a service worker (SW) identifier and information of a version of the service worker (SW) specified by the service worker (SW) identifier, and
the data processing unit performs update processing by referring to the SWIT and checking the service worker (SW) identifier and the version.

(5) The reception apparatus according to any one of (1) to (4), in which
the SWIT is a table recording a resource identifier of a resource to be managed by the service worker (SW) and information of a version of the resource specified by the resource identifier, and
the data processing unit performs update processing by referring to the SWIT and checking the resource identifier and the version.

(6) The reception apparatus according to any one of (1) to (5), in which
the SWIT records an identifier of an update group to which a resource to be managed by the service worker (SW) belongs and update schedule information corresponding to the update group, and
the data processing unit performs resource update processing in a group unit by referring to the SWIT and checking the identifier of the update group and the update schedule information corresponding to the update group.

(7) The reception apparatus according to any one of (1) to (6), in which
the SWIT records an identifier of an update group of the service worker (SW) and update schedule information corresponding to the update group, and
the data processing unit performs service worker (SW) update processing in a group unit by referring to the SWIT and checking the identifier of the update group and the update schedule information corresponding to the update group.

(8) The reception apparatus according to any one of (1) to (7), in which
the SWIT records next update date/time information or update frequency information as update schedule information of the service worker (SW) or a service worker (SW) management resource, and
the data processing unit performs update processing of the service worker (SW) or the service worker (SW) management resource in accordance with the update schedule information recorded in the SWIT.

(9) The reception apparatus according to any one of (1) to (8), in which the data processing unit receives the service worker information table (SWIT) transmitted from a transmission apparatus, and performs processing using a partial PSWIT which is a table in which information on a specific service worker (SW) to be processed is selected and extracted from the SWIT.

(10) A transmission apparatus which transmits a service worker information table (SWIT) which is a table storing information on a service worker (SW), which is a data management program for stored data of a reception apparatus, and contains update processing information in an individual service worker (SW) unit.

(11) The transmission apparatus according to (10), in which the SWIT is a table recording a service worker (SW) identifier and update information on a management resource of the service worker (SW) specified by the service worker (SW) identifier, and enables the reception apparatus to perform update processing regarding the management resource of the service worker (SW) by referring to the SWIT.

(12) The transmission apparatus according to (10) or (11), in which the SWIT is a table recording a service worker (SW) identifier and update information on the service worker (SW) itself specified by the service worker (SW) identifier, and enables the reception apparatus to perform update processing of the service worker (SW) by referring to the SWIT.

(13) A data processing method performed in a reception apparatus including:
receiving, by a data processing unit of the reception apparatus, a service worker information table (SWIT) which is a table storing information on a service worker (SW), which is a data management program for stored data, and contains update processing information in an individual service worker (SW) unit; and
performing, by the data processing unit, data management processing using the received SWIT.

(14) A data processing method performed in a transmission apparatus including transmitting a service worker information table (SWIT) which is a table storing information on a service worker (SW), which is a data management program for stored data of a reception apparatus, and contains update processing information in an individual service worker (SW) unit.

Furthermore, a series of processing described in the specification can be performed by hardware, software, or combination of the two. When the processing is performed by software, a program recording a processing sequence can be installed in a memory in a computer incorporated in dedicated hardware and executed, or installed in a general purpose computer capable of performing various types of processing and executed. For example, the program can be recorded in a recording medium in advance. In addition to installing the program from the recording medium in a computer, the program can be received via a network such as a local area network (LAN) or the internet and installed in a recording medium such as an incorporated hard disk.

Note that, the processing described in the specification is performed in time series according to the description, and may be performed in parallel or independently according to the processing performance of an apparatus which performs the processing or as needed. Furthermore, a system in the present specification is a logical assembled configuration of a plurality of apparatuses, and is not limited to the one in which the apparatuses are in the same housing.

INDUSTRIAL APPLICABILITY

As described above, according to one embodiment of the present disclosure, it is possible to achieve an apparatus and a method for efficiently reliably performing update processing of a service worker (SW) which is a data management program in a reception apparatus and its management resource.

Specifically, for example, a service worker information table (SWIT) which is a table storing information on the service worker (SW), which is a data management program for stored data of the reception apparatus, and contains update processing information in an individual SW unit is received, and data management processing using the received SWIT is executed. The SWIT is a table recording an SW identifier and update information on the SW and a management resource specified by the SW identifier, and the reception apparatus performs update processing of the SW and the management resource by referring to the SWIT.

With the present configuration, it is possible to achieve an apparatus and a method for efficiently reliably executing a service worker (SW) which is a data management program in a reception apparatus and update processing of its management resource.

REFERENCE SIGNS LIST

10 Communication system
20 Transmission apparatus
21 Broadcast server
22 Data delivery server
30 Reception apparatus
31 TV
32 PC
33 Mobile terminal
50 Signaling data
60 AV segment
70 Other data
151 Data processing unit
152 Communication unit
153 Network I/F
171 Packet demultiplexer
172 Video data processing unit
173 Audio data processing unit
174 System control unit
175 Application control unit
176 Cache unit
177 Service worker (SW) control unit
178 Middleware cache unit
179 Storage unit (Permanent cache unit)
180 Output control unit (Browser)
181 Combining processing unit
751 Data processing unit
752 Communication unit
753 Storage unit
771 Data processing unit
772 Communication unit
773 Storage unit
774 Input unit
775 Output unit
801 CPU
802 ROM
803 RAM
804 Bus 805 Input/output interface
806 Input unit
807 Output unit
808 Storage unit
809 Communication unit
810 Drive
811 Removable medium

The invention claimed is:

1. A reception apparatus comprising:
a processor configured to
   receive a service worker information table (SWIT) storing information on a service worker (SW) which is a data management program managing a resource, which includes at least one of an application executed in the reception apparatus and data used by the application, after a program corresponding to the service worker (SW) changes;
   acquire update schedule information corresponding to the service worker (SW) from the received SWIT; and
   perform update processing of at least one of the service worker (SW) and the resource managed by the service worker (SW) according to the acquired update schedule information, wherein
   the SWIT records an identifier of an update group to which the resource managed by the service worker (SW) belongs and update schedule information corresponding to the update group, and
   the processor performs resource update processing in a group unit by referring to the SWIT and checking the identifier of the update group and the update schedule information corresponding to the update group.

2. The reception apparatus according to claim 1, wherein the SWIT is a table recording a service worker (SW) identifier and update information on the resource managed by the service worker (SW) specified by the service worker (SW) identifier, and
the processor performs the update processing regarding the resource managed by the service worker (SW) by referring to the SWIT.

3. The reception apparatus according to claim 1, wherein the SWIT is a table recording a service worker (SW) identifier and update information on the service worker (SW) specified by the service worker (SW) identifier, and
the processor performs the update processing of the service worker (SW) by referring to the SWIT.

4. The reception apparatus according to claim 1, wherein the SWIT is a table recording a service worker (SW) identifier and information of a version of the service worker (SW) specified by the service worker (SW) identifier, and
the processor performs the update processing by referring to the SWIT and checking the service worker (SW) identifier and the version.

5. The reception apparatus according to claim 1, wherein the SWIT is a table recording a resource identifier of the resource managed by the service worker (SW) and information of a version of the resource specified by the resource identifier, and
the processor performs the update processing by referring to the SWIT and checking the resource identifier and the version.

6. The reception apparatus according to claim 1, wherein the SWIT records an identifier of an update group of the service worker (SW) and update schedule information corresponding to the update group, and
the processor performs service worker (SW) update processing in a group unit by referring to the SWIT and checking the identifier of the update group and the update schedule information corresponding to the update group.

7. The reception apparatus according to claim 1, wherein the SWIT records next update date/time information or update frequency information as the update schedule information of the service worker (SW) or resource managed by the SW, and
the processor performs the update processing of the service worker (SW) or the resource managed by the SW in accordance with the update schedule information recorded in the SWIT.

8. The reception apparatus according to claim 1, wherein the processor receives the SWIT transmitted from a transmission apparatus, and performs processing using a partial SWIT which is a table in which information on a specific service worker (SW) to be processed is selected and extracted from the SWIT.

9. A transmission apparatus comprising:
a server configured to
   transmit a service worker information table (SWIT) storing information on a service worker (SW) which is a data management program managing a resource, which includes at least one of an application executed in a reception apparatus and data used by the application, after a program corresponding to the service worker (SW) changes in the reception apparatus, wherein
   the SWIT includes update schedule information enabling update processing in the reception apparatus of at least one of the service worker (SW) and the resource managed by the service worker (SW), and
   the SWIT records an identifier of an update group to which the resource managed by the service worker (SW) belongs and update schedule information corresponding to the update group, and enables the reception apparatus to perform resource update processing in a group unit by referring to the SWIT and checking the identifier of the update group and the update schedule information corresponding to the update group.

10. The reception apparatus according to claim 1, wherein the data used by the application includes at least one of a moving image, a still image, and audio.

11. The reception apparatus according to claim 1, wherein manage the resource includes at least one of acquisition of the resource, update of the resource, deletion processing of the resource, and use of the resource.

12. The reception apparatus according to claim 1, wherein the program corresponding to the service worker (SW) changes includes the program ending, a channel of the program being changed, or data of the program being no longer received.

13. The reception apparatus according to claim 1, wherein
the resource includes at least one of an application, a moving image, a still image, and audio;
manage the resource includes at least one of acquisition of the resource, update of the resource, deletion processing of the resource, and use of the resource; and
the program corresponding to the service worker (SW) changes includes the program ending, a channel of the program being changed, or data of the program being no longer received.

14. The transmission apparatus according to claim 9, wherein the SWIT is a table recording a service worker (SW) identifier and update information on the resource managed by the service worker (SW) specified by the service worker (SW) identifier, and enables the reception apparatus to perform the update processing regarding the resource managed by the service worker (SW) by referring to the SWIT.

15. The transmission apparatus according to claim 9, wherein the SWIT is a table recording a service worker (SW) identifier and update information on the service worker (SW) specified by the service worker (SW) identifier, and enables the reception apparatus to perform the update processing of the service worker (SW) by referring to the SWIT.

16. A data processing method performed in a reception apparatus comprising:
   receiving, by a processor of the reception apparatus, a service worker information table (SWIT) storing information on a service worker (SW) which is a data management program managing a resource, which includes at least one of an application executed in the reception apparatus and data used by the application, after a program corresponding to the service worker (SW) changes;
   acquiring update schedule information corresponding to the service worker (SW) from the received SWIT; and
   performing update processing of at least one of the service worker (SW) and the resource managed by the service worker (SW) according to the acquired update schedule information, wherein
   the SWIT records an identifier of an update group to which the resource managed by the service worker (SW) belongs and update schedule information corresponding to the update group, and
   the method further includes performing resource update processing in a group unit by referring to the SWIT and checking the identifier of the update group and the update schedule information corresponding to the update group.

17. A data processing method performed in a transmission apparatus comprising:
   transmitting a service worker information table (SWIT) storing information on a service worker (SW) which is a data management program managing a resource, which includes at least one of an application executed in a reception apparatus and data used by the application, after a program corresponding to the service worker (SW) changes in the reception apparatus, wherein
   the SWIT includes update schedule information enabling update processing in the reception apparatus of at least one of the service worker (SW) and the resource managed by the service worker (SW), and
   the SWIT records an identifier of an update group to which the resource managed by the service worker (SW) belongs and update schedule information corresponding to the update group, and enables the reception apparatus to perform resource update processing in a group unit by referring to the SWIT and checking the identifier of the update group and the update schedule information corresponding to the update group.

\* \* \* \* \*